US012766496B2

(12) United States Patent
Bang et al.

(10) Patent No.: US 12,766,496 B2
(45) Date of Patent: Oct. 20, 2026

(54) ELECTROCHEMICAL CATALYST AND PREPARATION METHOD THEREFOR

(71) Applicant: INDUSTRY-UNIVERSITY COOPERATION FOUNDATION HANYANG UNIVERSITY ERICA CAMPUS, Ansan-Si (KR)

(72) Inventors: Jin Ho Bang, Ansan-si (KR); Min Soo Kim, Ansan-si (KR); Thota Raju, Ansan-si (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 894 days.

(21) Appl. No.: 17/757,458

(22) PCT Filed: Dec. 21, 2020

(86) PCT No.: PCT/KR2020/018815

§ 371 (c)(1),
(2) Date: Jun. 16, 2022

(87) PCT Pub. No.: WO2021/125915

PCT Pub. Date: Jun. 24, 2021

(65) Prior Publication Data

US 2023/0024514 A1 Jan. 26, 2023

(30) Foreign Application Priority Data

Dec. 20, 2019 (KR) ........................ 10-2019-0171737

(51) Int. Cl.
*B01J 37/08* (2006.01)
*C25B 1/02* (2006.01)
*C25B 11/031* (2021.01)
*C25B 11/042* (2021.01)

(52) U.S. Cl.
CPC ................. *B01J 37/08* (2013.01); *C25B 1/02* (2013.01); *C25B 11/031* (2021.01); *C25B 11/042* (2021.01)

(58) Field of Classification Search
CPC ...... B01J 37/08; C25B 11/031; C25B 11/042; C25B 11/02; Y02E 60/36; Y02E 60/50; H01M 4/86; H01M 4/90; H01M 4/8657; H01M 4/9016; H01M 4/9041
See application file for complete search history.

(56) References Cited

FOREIGN PATENT DOCUMENTS

| | | | |
|---|---|---|---|
| CN | 109745929 | A | 5/2019 |
| CN | 106669738 | B | 6/2019 |
| JP | 6315532 | B | 4/2018 |
| KR | 10-0703032 | B1 | 4/2007 |
| KR | 10-1661821 | B1 | 10/2016 |
| WO | 2018044241 | A1 | 3/2018 |

OTHER PUBLICATIONS

Pham Quang et al., Sensors and Actuators, B270, (2018), p. 158-166.*
Hydrogen Sulfide H2S 100 ppm_Calibration Gas N2_Cal Gas Direct (downloaded Apr. 1, 2026).*
Yang et al., "Core-Shell Nanostructured 'Black' Rutile Titania as Excellent Catalyst for Hydrogen Production Enhanced by Sulfur Doping", J. Am. Chem. Soc., Just Accepted Manuscript (Oct. 28, 2013).
Yan et al., "Heterojunction-Assisted Co3S4@Co3O4 Core-Shell Octahedrons for Supercapacitors and Both Oxygen and Carbon Dioxide Reduction Reactions", Small 1701724, DOI: 10.1002/smll.201701724 (2017).
International Search Report for International Application No. PCT/KR2020/018815 dated Apr. 23, 2021, 3 pages.
Written Opinion of the International Searching Authority for International Application No. PCT/KR2020/018815 dated Apr. 23, 2021, 6 pages.

* cited by examiner

*Primary Examiner* — Yong L Chu
(74) *Attorney, Agent, or Firm* — Secant IP, P.L.L.C.

(57) ABSTRACT

Provided are an electrochemical catalyst and a preparation method therefor. The preparation method for an electrochemical catalyst may comprise the steps of preparing a base metal aqueous solution containing a base metal, hydrothermally synthesizing a base structure containing an oxide of the base metal by using the base metal aqueous solution, and using a heat treatment method for the base structure in a sulfur (S)-containing reactive gas atmosphere, exchanging oxygen (O) on the surface of the base structure with sulfur (S) of the reactive gas to form a catalyst structure which has a core structure containing the oxide of the base metal and a shell structure containing a sulfide of the base metal.

3 Claims, 39 Drawing Sheets

(a)

(b)

(a)

(b)

(a)

(b)

(a)

(b)

ELECTROCHEMICAL CATALYST AND PREPARATION METHOD THEREFOR

TECHNICAL FIELD

The present invention relates to an electrochemical catalyst and a method for preparing the same, and more particularly, to an electrochemical catalyst having a metal oxide and a metal sulfide and a method for preparing the same.

BACKGROUND ART

So far, the world's energy has been heavily dependent on energy sources such as coal, crude oil, natural gas, etc. Fossil fuels, nonrenewable energy which relies on limited sources that diminish with use, are either too expensive or cause a lot of damage to the environment. Thus, the creation of clean energy is required for the survival, health, and affluent life of human beings in the future of the 21st century.

One of the key technologies most needed to achieve clean energy is energy conversion, energy production, and energy storage using electrocatalysts. Typically, solar cells, batteries, fuel cells, hydrogen/oxygen/hydrocarbon generators, and electrochromic devices belong to applications closely related to electrochemical catalysts and are technologies using the principle of electrochemical catalysts. Accordingly, countries around the world are sparing no effort, time, and investment to preempt the source technology of electrochemical catalysts.

In particular, the development of low-cost and high-efficiency energy conversion systems is an important area that can provide solutions to future energy problems, and the core part of these energy conversion devices is electrochemical catalysts. Currently, it is expensive noble metal catalysts that are most commonly used. However, since precious metal catalysts have limited reserves and require high costs, studies have been continuously conducted on electrochemical catalysts without using noble metals.

DISCLOSURE

Technical Problem

One technical object of the present invention is to provide an electrochemical catalyst applicable to an oxygen evolution reaction (OER) or a hydrogen evolution reaction (HER), and a method for preparing the same.

Another technical object of the present invention is to provide an electrochemical catalyst with improved efficiency of oxygen evolution reaction (OER), and a method for preparing the same.

Still, another technical object of the present invention is to provide an electrochemical catalyst with improved efficiency of hydrogen evolution reaction (HER), and a method for preparing the same.

Still, another technical object of the present invention is to provide an electrochemical catalyst, which may be prepared through a top-down synthesis, and a method for preparing the same.

Still, another technical object of the present invention is to provide an electrochemical catalyst with a simplified process, and a method for preparing the same.

Still, another technical object of the present invention is to provide an electrochemical catalyst, to which a large-scale process is easily applied, and a method for preparing the same.

The technical objects of the present invention are not limited to the above.

Technical Solution

To solve the above technical objects, the present invention may provide a method for preparing an electrochemical catalyst.

According to one embodiment, the method for preparing an electrochemical catalyst may include the steps of providing a base metal aqueous solution containing a base metal, hydrothermally synthesizing a base structure containing an oxide of the base metal by using the base metal aqueous solution, and using a heat treatment method for the base structure in a sulfur (S)-containing reaction gas atmosphere, exchanging oxygen (O) on a surface of the base structure with the sulfur (S) of the reaction gas to form a catalyst structure which has a core structure containing the oxide of the base metal and a shell structure containing a sulfide of the base metal.

According to one embodiment, the reaction gas may include hydrogen sulfide ($H_2S$), and the hydrogen sulfide may be decomposed into sulfur (S) and hydrogen (H), in the forming of the catalyst structure, in which the decomposed sulfur (S) may be adsorbed on the surface of the base structure, and the decomposed hydrogen (H) may penetrate an inside of the base structure.

According to one embodiment, a plurality of pores may be formed in the base structure as the decomposed hydrogen (H) may penetrate inside of the base structure and react with the oxide of the base metal.

According to one embodiment, the base structure heat-treated in the reaction gas atmosphere may include a first base metal oxide, and a second base metal oxide in which the first base metal oxide may react with hydrogen (H) penetrated the inside of the base structure.

According to one embodiment, the shell structure may include a first base metal sulfide in which the oxygen (O) on the surface of the base structure is exchanged with the sulfur (S) of the reaction gas and a second base metal sulfide in which the first base metal sulfide is decomposed.

According to one embodiment, the providing of the base metal aqueous solution may include: preparing a source solution in which cobalt(II) nitrate hexahydrate is mixed with a solvent and mixing the source solution with polyvinylpyrrolidone.

To solve the above technical objects, the present invention may provide an electrochemical catalyst.

According to one embodiment, the electrochemical catalyst may include: a core structure including a first cobalt oxide, and a second cobalt oxide having a composition ratio different from that of the first cobalt oxide; and a shell formed on a surface of the core structure and including a first cobalt sulfide, and a second cobalt sulfide having a composition ratio different from that of the first cobalt sulfide, in which a content of the first cobalt oxide, the second cobalt oxide, the first cobalt sulfide, and the second cobalt sulfide may be controlled to improve oxygen generation efficiency in an oxygen evolution reaction (OER).

According to one embodiment, the first and second cobalt oxides may include $Co_3O$ and CoO, respectively, and the first and second cobalt sulfides may include $Co_3S_4$ and CoS, respectively.

According to one embodiment, the electrochemical catalyst may include 49 wt % or more of the first cobalt oxide, 40 wt % or less of the second cobalt oxide, 11 wt % or less of the first cobalt sulfide, and 0.5 wt % or less of the second cobalt sulfide.

According to one embodiment, the core structure may have a porous structure.

According to one embodiment, the diameter of pores formed in the core structure may be 12 nm or less.

According to another embodiment, the electrochemical catalyst may include a base structure in a form of a flat plate including a metal; a first material layer formed on a surface of the base structure and including an oxide of the metal; and a second material layer formed on a surface of the first material layer and including a sulfide of the metal.

According to another embodiment, the metal may include any one of cobalt (Co), molybdenum (Mo), tungsten (W), or vanadium (V).

According to another embodiment, the electrochemical catalyst may be used as a catalyst for an oxygen evolution reaction (OER) or a hydrogen evolution reaction (HER).

Advantageous Effects

A catalyst structure according to an embodiment of the present invention can include a core structure having a porous structure, and a shell structure formed on a surface of the core structure, in which the core structure can include a first base metal oxide (e.g., $Co_3O_4$) and a second base metal oxide (e.g., CoO), and the shell structure can include a first base metal sulfide (for example, $Co_3S_4$) and a second base metal sulfide (e.g., CoS). Accordingly, the catalyst structure can be used as a catalyst for an oxygen evolution reaction (OER), thereby improving oxygen generation efficiency.

In addition, in the method for preparing an electrochemical catalyst according to an embodiment of the present invention, hydrogen sulfide ($H_2S$) having high reducing power can be used in the process of preparing the catalyst structure, and thus a top-down synthesis method starting from bulk particles can be applied. Accordingly, the preparation process can be simplified and a method for preparing an electrochemical catalyst suitable for a large-scale production process can be provided.

MODE FOR INVENTION

Figure 1:
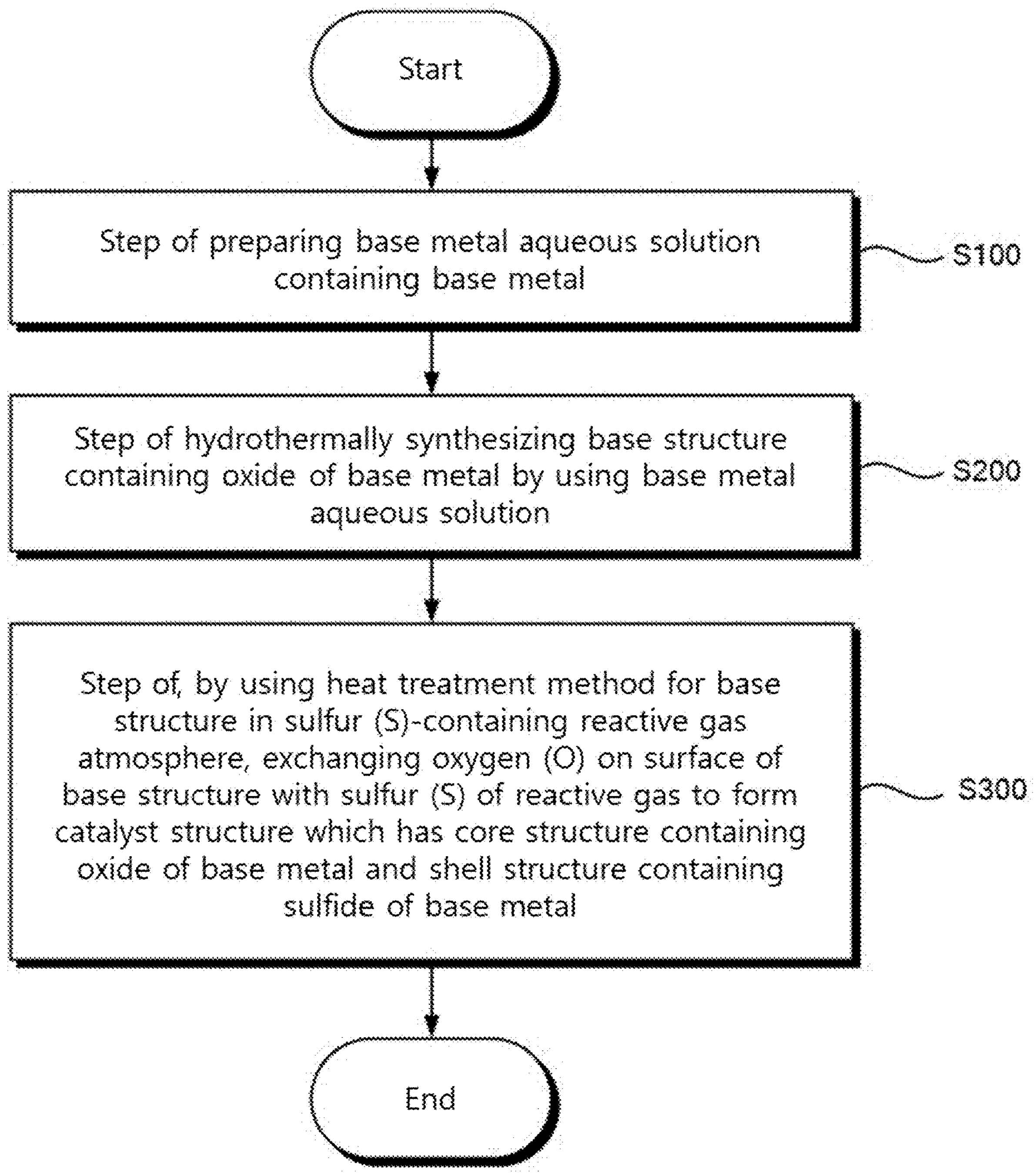
FIG. 1 is a flowchart explaining a method for preparing an electrochemical catalyst according to the first embodiment of the present invention.

Hereinafter, preferred embodiments of the present invention will be described in detail with reference to the accompanying drawings. However, the technical idea of the present invention is not limited to the embodiments described herein and may be embodied in other forms. The embodiments introduced herein are provided to sufficiently deliver the spirit of the present invention to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of membranes and areas are exaggerated for efficient description of the technical contents.

Further, in the various embodiments of the present specification, the terms such as first, second, and third are used to describe various elements, but the elements are not limited to the terms. The terms are used only to distinguish one element from another element. Accordingly, an element mentioned as the first element in one embodiment may be mentioned as the second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added. In addition, the term "connection" used herein may include the meaning of indirectly connecting a plurality of components, and directly connecting a plurality of components.

Further, in the following description of the present invention, a detailed description of known functions or configurations incorporated herein will be omitted when it may make the subject matter of the present invention unnecessarily unclear.

Figure 2:
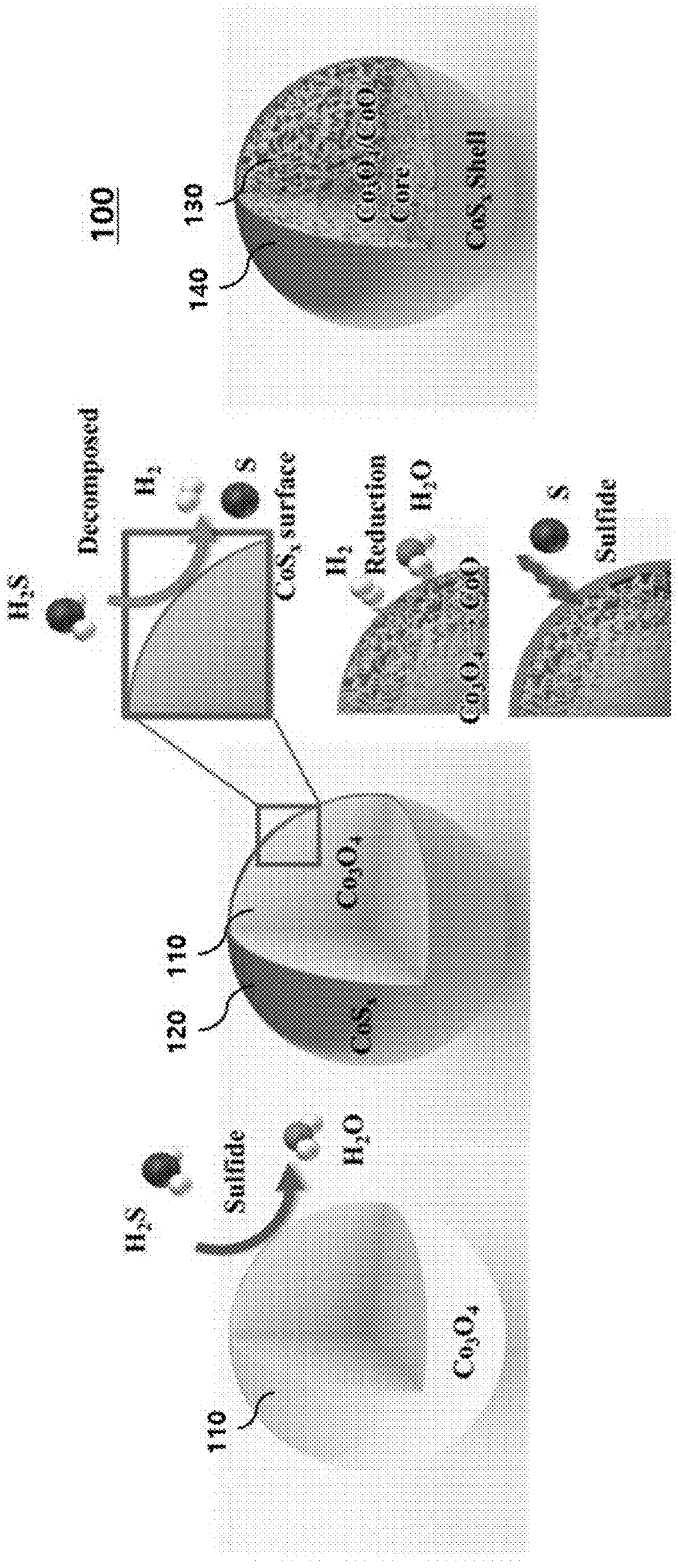
FIG. 2 is a view showing a process of preparing an electrochemical catalyst according to a second embodiment of the present invention.

FIG. 1 is a flowchart for explaining a method for preparing an electrochemical catalyst according to a first embodiment of the present invention, and FIG. 2 is a view showing a process of preparing an electrochemical catalyst according to a second embodiment of the present invention.

Preparing a Base Structure

Referring to FIG. 1, a base metal aqueous solution containing a base metal may be provided (S100). According to one embodiment, the providing of the base metal aqueous solution may include: preparing a source solution by mixing a base source containing a base metal with a solvent and mixing the source solution with polyvinylpyrrolidone. For example, the base metal may include cobalt (Co). For example, the base source may be cobalt(II) nitrate hexahydrate. For example, the solvent may be a solution in which ammonia water and distilled water (DI water) are mixed.

More specifically, the source solution may be prepared by mixing cobalt(II) nitrate hexahydrate having a concentration of 1.25 mmol with a solvent in which 50 ml of ammonia water and DI water are mixed at 3:1 vol %. After that, 0.1 g of polyvinylpyrrolidone was added to the prepared source solution and mixed at a speed of 600 rpm for 10 minutes to prepare the base metal aqueous solution.

A base structure containing an oxide of the base metal may be hydrothermally synthesized by using the base metal aqueous solution (S200). Specifically, for example, the base structure may be hydrothermally synthesized by transferring the base metal aqueous solution to an autoclave and heating it at a temperature of 180° C. for eight hours. As described above, when the base metal includes cobalt (Co), the base structure may include cobalt oxide ($Co_3O_4$). When a catalyst structure to be described later is prepared through the base structure including a cobalt oxide ($Co_3O_4$), the catalyst structure to be described later may be used as a catalyst for an oxygen evolution reaction (OER).

In contrast, according to another embodiment, the base metal may include molybdenum (Mo). In this case, the base structure may include a molybdenum oxide ($MoO_3$). Specifically, a base metal aqueous solution may be prepared by mixing sodium molybdate having a concentration of 10 mmol with 43 mL of distilled water (DI water), adding 2 ml of hydrochloric acid to the mixed solution, and then mixing at a speed of 500 rpm. After that, the base structure including a molybdenum oxide ($MoO_3$) may be prepared by transferring the base metal aqueous solution to a 70 mL Teflon-lined autoclave and heating at a temperature of 180° C. for 12 hours. When a catalyst structure to be described later is prepared through the base structure including a molybdenum oxide ($MoO_3$), the catalyst structure to be described later may be used as a catalyst for a hydrogen evolution reaction (HER).

In contrast, according to still another embodiment, the base metal may include tungsten (W). In this case, the base structure may include tungsten oxide ($WO_3$). Specifically, a base metal aqueous solution may be prepared by adding 10 mL of glycerol to 25 mL of distilled water, mixing at a speed of 1000 rpm for 30 minutes, adding 0.66 g of sodium tungstate dihydride to the resulting solution, and adding 2.5 mL of HCl (12 M). After that, the base structure including a tungsten oxide ($WO_3$) may be prepared by transferring the base metal aqueous solution to a 20 mL Teflon-lined autoclave and heating at a temperature of 180° C. for 90 hours. When a catalyst structure to be described later is prepared through the base structure including a tungsten oxide ($WO_3$), the catalyst structure to be described later may be used as a catalyst for a hydrogen evolution reaction (HER).

In contrast, according to still another embodiment, the base metal may include vanadium (V). In this case, the base structure may include vanadium oxide ($V_2O_5$). Specifically, a base metal aqueous solution may be prepared by mixing $NH_4VO_5$ having a concentration of 2 mmol with 45 ml of distilled water, adding 1 mL of HCl (1M) to the resulting solution, and mixing at a speed of 1000 rpm for 30 minutes. After that, a precipitate may be obtained from the base metal aqueous solution through a centrifugal separator (7000 rpm, 10 minutes), and the obtained precipitate may be washed and dried (60° C., 12 hours) to obtain a powder. Finally, the obtained powder may be heat-treated at a temperature of 550° C. for five minutes, thereby preparing the base structure including vanadium oxide ($V_2O_5$). When a catalyst structure to be described later is prepared through the base structure including a vanadium oxide ($V_2O_5$), the catalyst structure to be described later may be used as a catalyst for a hydrogen evolution reaction (HER).

Preparing of Catalyst Structure

Referring to FIGS. 1 and 2, the base structure 110 may be heat-treated under a reaction gas atmosphere, thereby forming a catalyst structure 100 (S300). According to one embodiment, the reaction gas may include sulfur (S). For example, the reaction gas may be hydrogen sulfide ($H_2S$).

According to one embodiment, the catalyst structure 100 formed by heat-treating the base structure 110 including a cobalt oxide ($Co_3O_4$) under the reaction gas ($H_2S$) may include $Co_3O_4$, CoO, $Co_3S_4$, and CoS. In contrast, according to another embodiment, the catalyst structure 100 formed by heat-treating the base structure 110 including a molybdenum oxide ($MoO_3$) under the reaction gas ($H_2S$) may include $MoO_2$ and $MoS_2$. In contrast, according to still another embodiment, the catalyst structure 100 formed by heat-treating the base structure 110 including a tungsten oxide ($WO_3$) under the reaction gas ($H_2S$) may include $WO_2$ and $WS_2$. In contrast, according to still another embodiment, the catalyst structure 100 formed by heat-treating the base structure 110 including a vanadium oxide ($V_2O_5$) under the reaction gas ($H_2S$) may include $VS_2$.

Hereinafter, in describing the process of forming the catalyst structure 100 in detail, the base structure 110 including a cobalt oxide ($Co_3O_4$) will be exemplarily described.

When the reaction gas (e.g., $H_2S$) is heat-treated, the reaction gas may be decomposed into sulfur (S) and hydrogen (H) according to <Formula 1> below.

$$H_2S \rightarrow H_2 + S_{ad} \quad \text{<Formula 1>}$$

Sulfur (S) decomposed from the reaction gas may be adsorbed on a surface of the base structure 110. Sulfur (S) adsorbed on the surface of the base structure 110 may be exchanged with oxygen (O) on the surface of the base structure 110 according to <Formula 2> below. Accordingly, a preliminary shell structure 120 including a first base metal sulfide may be formed on the surface of the base structure 110. For example, the first base metal sulfide may be $Co_3S_4$.

$$CO_3O_4 + 4H_2 + 4S_{ad} \rightarrow CO_3S_4 + 4H_2O \quad \text{<Formula 2>}$$

In addition, when continuously heat-treating the base structure 110 under the reaction gas atmosphere after the preliminary shell structure 120 is formed, a second base metal sulfide in which the first base metal sulfide is decomposed according to <Formula 3> below may be formed. For example, the second base metal sulfide may be CoS. Accordingly, the shell structure 140 including the first base metal sulfide (e.g., $Co_3S_4$) and the second base metal sulfide (e.g., CoS) will be formed on the surface of the base structure 110.

$$Co_3S_4 \rightarrow 3\ CoS + S \quad \text{<Formula 3>}$$

Unlike sulfur (S) decomposed from the reaction gas, hydrogen (H) decomposed from the reaction gas may penetrate the base structure 110. Hydrogen (H) penetrated an inside of the base structure 110 may be reacted with an oxide (e.g., $Co_3O_4$) of the base metal according to the following <Formula 4>. Accordingly, the base structure 110 may include a first base metal oxide, and a second base metal oxide in which the first base metal oxide may react with hydrogen (H) penetrated the inside of the base structure. For example, the first base metal oxide may be $Co_3S_4$, and the second base metal oxide may be CoO. In addition, a plurality of pores may be formed in the base structure 110 due to a reaction between the oxide of the base metal and hydrogen. The base structure 110 including the first base metal oxide ($Co_3O_4$) and the second base metal oxide (CoO) and formed with a plurality of pores may be defined as a core structure 130.

$$CO_3O_4 + H_2 \rightarrow 3CoO + H_2O \quad \text{<Formula 4>}$$

As a result, the catalyst structure 100 may include the core structure 130 having a porous structure, and the shell structure 140 formed on a surface of the core structure 130, in which the core structure 130 may include the first base metal oxide ($Co_3O_4$) and the second base metal oxide (CoO), and the shell structure 140 may include the first base metal sulfide ($Co_3S_4$) and the second base metal sulfide (CoS). Accordingly, the catalyst structure 100 may be used as a catalyst for an oxygen evolution reaction (OER), thereby improving oxygen generation efficiency.

According to one embodiment, in the catalyst structure 100, the content of the first and second base metal oxides ($Co_3O_4$, CoO) and the first and second base metal sulfides ($Co_3S_4$, CoS) may be controlled, and thus the oxygen generation efficiency of the catalyst structure 100 may be further improved.

According to one embodiment, during the process of preparing the catalyst structure 100, the temperature and time at which the base structure 110 is heat-treated under the reaction gas atmosphere ($H_2S$) may be controlled, and thus the content of the first and second base metal oxides ($Co_3O_4$, CoO) and the first and second base metal sulfides ($Co_3S_4$, CoS) may be controlled.

Specifically, the base structure 110 may be heat-treated at a temperature of 350° C. under the reaction gas atmosphere ($H_2S$) for 10 minutes or less. In this case, the catalyst structure 100 may include 49 wt % or more of the first base metal oxide ($Co_3O_4$), 40 wt % or less of the second base metal oxide (CoO), 11 wt % or less of the first base metal sulfide ($Co_3O_4$), ($Ce_3O_4$), and 0.5 wt % or less of the second base metal sulfide (CoS). The core structure 130 of the catalyst structure 100 having the above-described content may have a pore diameter of 12 nm or less. Accordingly, the catalyst structure 100 may improve oxygen generation efficiency when being used in an oxygen evolution reaction (OER).

In addition, as described above, in the method for preparing an electrochemical catalyst according to an embodiment of the present invention, hydrogen sulfide ($H_2S$) having high reducing power may be used in the process of preparing the catalyst structure 100, and thus a top-down synthesis method starting from bulk particles can be applied. Accordingly, the preparation process may be simplified and the method for preparing an electrochemical catalyst suitable for a large-scale production process may be provided.

As above, the electrochemical catalyst according to the first embodiment of the present invention and the method for preparing the same has been described. Hereinafter, the electrochemical catalyst according to a second embodiment of the present invention and a method for preparing the same will be described.

According to the second embodiment of the present invention, the electrochemical catalyst may include a base structure in a form of a flat plate including a metal, a first material layer formed on the surface of the base structure, and a second material layer formed on a surface of the first material layer. According to one embodiment, the metal may include any one of cobalt (Co), molybdenum (Mo), tungsten (W), or vanadium (V).

The first material layer may include an oxide of the metal. According to one embodiment, the first material layer may include a natural oxide layer of the metal. In contrast, the second material layer may include a sulfide of the metal. According to one embodiment, the second material layer may be a material layer formed by the same method as that of heat-treating the base structure 110 under the reaction gas ($H_2S$) atmosphere in the method for preparing an electrochemical catalyst according to the first embodiment, described with reference to FIGS. 1 and 2. In other words, the second material layer may be formed by heat-treating the base structure, on which the first material layer is formed, under the reaction gas ($H_2S$) atmosphere.

The electrochemical catalyst according to the second embodiment may be used as a catalyst for an oxygen evolution reaction (OER) or a hydrogen evolution reaction (HER). In addition, like the method for preparing an electrochemical catalyst according to the first embodiment of the present invention, hydrogen sulfide ($H_2S$) having high reducing power may be used, and thus a top-down synthesis method starting from bulk particles may be applied. Accordingly, the preparation process may be simplified and may be easily applied to a large-scale production process.

As above, the electrochemical catalyst according to a second embodiment of the present invention and the method for preparing the same has been described. Hereinafter, specific experimental embodiments and the results of evaluating properties will be described with regard to the electrochemical catalyst according to an embodiment of the present invention.

Preparing the Electrochemical Catalyst According to Example 1

A source solution may be prepared by mixing cobalt(II) nitrate hexahydrate having a concentration of 1.25 mmol with a solvent in which 50 ml of ammonia water and distilled water (DI water) were mixed at 3:1 vol %. After that, 0.1 g of polyvinylpyrrolidone was added to the prepared source solution and mixed at a speed of 600 rpm for 10 minutes to prepare a base metal aqueous solution. The prepared base metal aqueous solution was transferred to a 70 mL Teflon-lined autoclave, and heated at a temperature of 180° C. for eight hours, and thus $Co_3O_4$ was hydrothermally synthesized. In addition, a precipitate was obtained from $Co_3O_4$ hydrothermally synthesized through a centrifugal separator (7000 rpm, 10 minutes), and the obtained precipitate was washed with DI water and ethanol, and then heat-treated in an oven at a temperature of 60° C. for 12 hours, to prepare a $Co_3O_4$ base structure.

Finally, the $Co_3O_4$ base structure was heat-treated (350° C., 10° C./min) under a gas atmosphere, in which argon (Ar) and hydrogen sulfide ($H_2S$) were mixed, and cooled in an $N_2$ gas atmosphere, to prepare an electrochemical catalyst according to Example 1 having a $Co_3O_4$—CoO core structure/$Co_3S_4$—CoS shell structure.

Preparing the Electrochemical Catalyst According to Example 2

A base metal aqueous solution was prepared by mixing sodium molybdate having a concentration of 10 mmol with 43 mL of distilled water (DI water), adding 2 ml of hydrochloric acid to the mixed solution, and then mixing at a speed of 500 rpm. After that, the base metal aqueous solution was transferred to a 70 mL Teflon-lined autoclave, and heated at a temperature of 180° C. for 12 hours, and thus $MoO_3$ was hydrothermally synthesized. In addition, a precipitate was obtained from $MoO_3$ hydrothermally synthesized through a centrifugal separator (7000 rpm, 10 minutes), and the obtained precipitate was washed with DI water and ethanol, and then heat-treated in an oven at a temperature of 60° C. for 12 hours, to obtain a $MoO_3$ powder. The obtained powder was heat-treated at a temperature of 500° C. for two hours to prepare a $MoO_3$ base structure.

Finally, the $MoO_3$ base structure was heat-treated (350° C., 10° C./min, 60 minutes) under a gas atmosphere, in which argon (Ar) and hydrogen sulfide ($H_2S$) were mixed, and cooled in an $N_2$ gas atmosphere, to prepare an electrochemical catalyst according to Example 2 having a $MoO_2$ core structure/$MoS_2$ shell structure.

Preparing the Electrochemical Catalyst According to Example 3

A base metal aqueous solution was prepared by adding 10 mL of glycerol to 25 mL of distilled water, mixing at a speed of 1000 rpm for 30 minutes, adding 0.66 g of sodium tungstate dihydride to the resulting solution, and adding 2.5 mL of HCl (12 M). After that, the base metal aqueous solution was transferred to a 20 mL Teflon-lined autoclave, and heated at a temperature of 180° C. for minutes, and thus $WO_3$ was hydrothermally synthesized. In addition, a precipitate was obtained from $WO_3$ hydrothermally synthesized through a centrifugal separator (7000 rpm, 10 minutes), and the obtained precipitate was washed with distilled water (DI water) and ethanol, and then heat-treated in an oven at a temperature of 60° C. for 12 hours, to obtain a $WO_3$ powder. The obtained powder was heat-treated at a temperature of 500° C. for two hours to prepare a $WO_3$ base structure.

Finally, the $WO_3$ base structure was heat-treated (350° C., 10° C./min, 60 minutes) under a gas atmosphere, in which argon (Ar) and hydrogen sulfide ($H_2S$) were mixed, and cooled in an $N_2$ gas atmosphere, to prepare an electrochemical catalyst according to Example 3 having a $WO_3$ core structure/$WS_2$ shell structure.

Preparing the Electrochemical Catalyst According to Example 4

A base metal aqueous solution was prepared by mixing $NH_4VO_5$ having a concentration of 2 mmol with 45 ml of distilled water, adding 1 mL of HCl (1M) to the resulting solution, and mixing at a speed of 1000 rpm for 30 minutes. After that, a precipitate was obtained from the base metal aqueous solution through a centrifugal separator (7000 rpm, 10 minutes), and the obtained precipitate was washed and dried (60° C., 12 hours) to obtain a powder. Finally, the obtained powder was heat-treated at a temperature of 550° C. for five minutes, thereby preparing the base structure including vanadium oxide ($V_2O_5$).

Finally, the $V_2O_5$ base structure was heat-treated (300° C., 10° C./min, 30 minutes) under a gas atmosphere, in which argon (Ar) and hydrogen sulfide ($H_2S$) were mixed, and cooled in an $N_2$ gas atmosphere, to prepare an electrochemical catalyst according to Example 4 having a bulk $VS_2$ structure.

The electrochemical catalysts according to above Examples 1 to 4 are summarized in <Table 1> below.

TABLE 1

| Classification | Base structure | Catalyst structure |
|---|---|---|
| Example 1 | $Co_3O_4$ | $Co_3O_4$—CoO core structure/ $Co_3S_4$—CoS shell structure |
| Example 2 | $MoO_3$ | $MoO_2$ core structure/$MoS_2$ shell structure |
| Example 3 | $WO_3$ | $WO_3$ core structure/$WS_2$ shell structure |
| Example 4 | $V_2O_5$ | Bulk $VS_2$ |

Figure 3:
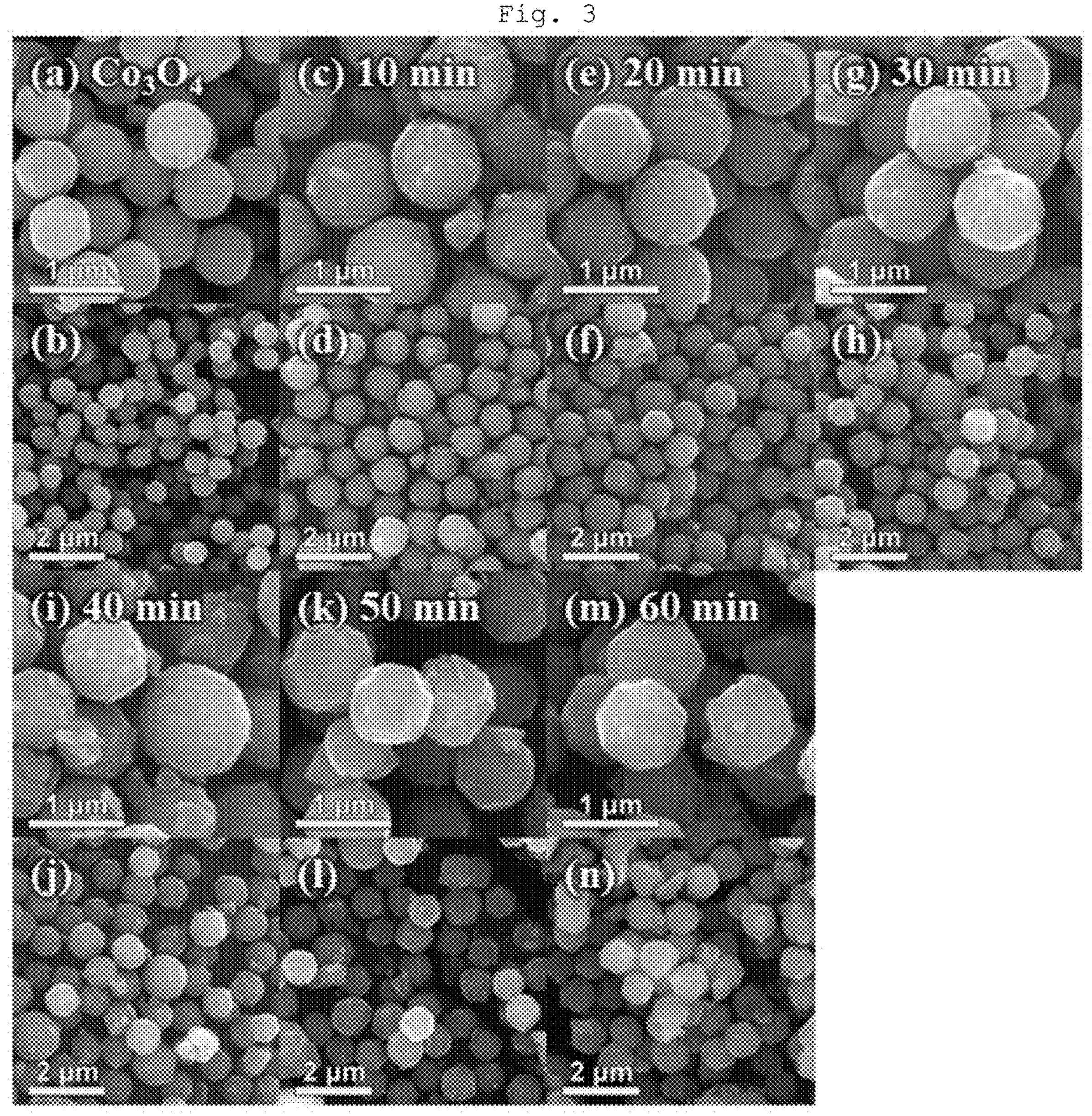
FIG. 3 is a view showing SEM images of a catalyst structure and a base structure according to Example 1 of the present invention.

FIG. 3 is a view showing SEM images of a catalyst structure and a base structure according to Example 1 of the present invention. Referring to (a) and (b) of FIGS. 3, a scanning electron microscope (SEM) image of the base structure provided in the process of preparing the catalyst structure according to above Example 1 is shown, and referring to (c) to (n) of FIGS. 3, the catalyst structure according to above Example 1 was provided, but a heat-treatment time is controlled to be 10, 20, 30, 40, 50, and 60 minutes to prepare a plurality of catalyst structures formed, after which SEM images for each are shown.

As can be understood from (a) to (n) of FIG. 3, it could be confirmed that the $Co_3O_4$ base structure has an average size of 700 nm and a spherical shape, which is maintained despite an increase in the heat treatment time. In addition, it could be confirmed that a $Co_3S_4$—CoS shell structure is formed on the surface of the base structure as the base structure is heat-treated under a hydrogen sulfide ($H_2S$) atmosphere.

Alternatively, with regard to the above-described base structure and the catalyst structures prepared at different heat treatment times, respectively, a Brunauer-Emmett-Teller (BET) surface area ($a_{s,BET}$), a total pore volume, and mean pore diameters were measured and the results thereof are summarized in <Table 2> below.

TABLE 2

| Classification | $a_{s,BET}$ ($m^2/g$) | Total pore volume ($p/p_0 = 0.990$) ($cm^3/g$) | Mean pore diameter (nm) |
|---|---|---|---|
| Base structure | 1.449 | 0.01 | 27.754 |
| Catalyst structure (heat-treated for 10 minutes) | 6.134 | 0.017 | 11.688 |
| Catalyst structure (heat-treated for 20 minutes) | 6.846 | 0.023 | 13.221 |
| Catalyst structure (heat-treated for 30 minutes) | 3.551 | 0.014 | 15.647 |
| Catalyst structure (heat-treated for 40 minutes) | 2.383 | 0.0125 | 20.976 |
| Catalyst structure (heat-treated for 50 minutes) | 2.257 | 0.012 | 20.457 |
| Catalyst structure (heat-treated for 60 minutes) | 2.189 | 0.011 | 20.509 |

Figure 4:
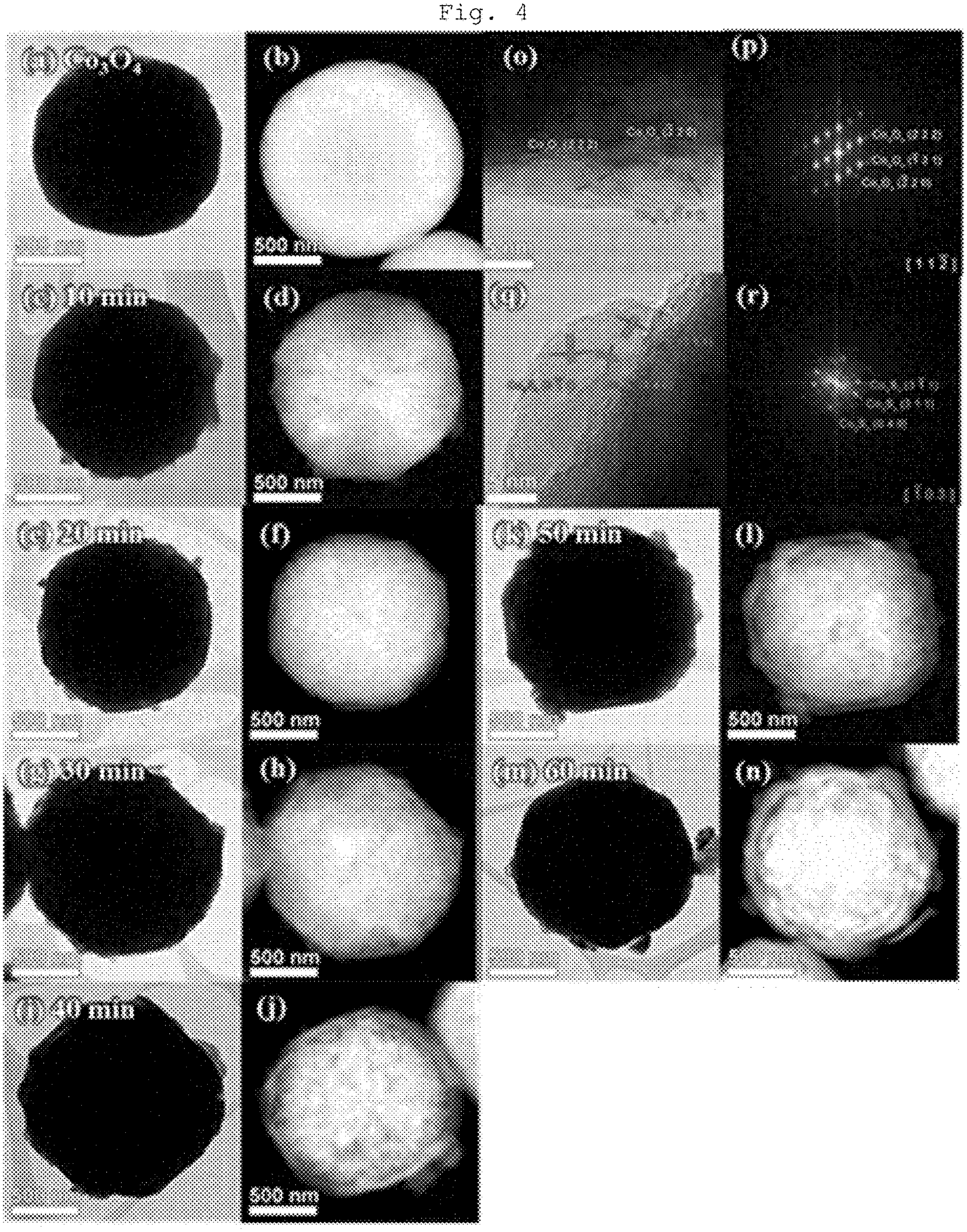
FIG. 4 is a view showing TEM images of a catalyst structure and a base structure according to Example 1 of the present invention.

As can be understood from <Table 2>, it could be confirmed that the BET surface area of the catalyst structure increases compared to the base structure. In particular, it could be confirmed that the BET surface area increases while the heat treatment time increases from 10 to 20 minutes, but the BET surface area gradually decreases when the heat treatment time exceeds 20 minutes. Accordingly, it can be seen that the degree of sulfidation of the catalyst structure increases as the heat treatment time increases. FIG. 4 is a view showing TEM images of a catalyst structure and a base structure according to Example 1 of the present invention.

Referring to (a) and (b) of FIG. 4, a transmission electron microscope (TEM) image of the base structure prepared in the process of preparing the catalyst structure according to above Example 1 is shown. Referring to (c) and (d) of FIG. 4, a TEM image of the catalyst structure according to above Example 1 formed by heat treatment for 10 minutes is shown. Referring to (e) and (f) of FIG. 4, a TEM image of the catalyst structure according to above Example 1 formed by heat treatment for 20 minutes is shown. Referring to (g) and (h) of FIG. 4, a TEM image of the catalyst structure according to above Example 1 formed by heat treatment for 30 minutes is shown. Referring to (i) and (j) of FIG. 4, a TEM image of the catalyst structure according to above Example 1 formed by heat treatment for 40 minutes is shown. Referring to (k) and (l) of FIG. 4, a TEM image of the catalyst structure according to above Example 1 formed by heat treatment for 50 minutes is shown. And, referring to (m) and (n) of FIG. 4, a TEM image of the catalyst structure according to above Example 1 formed by heat treatment for 60 minutes is shown. (a), (c), (e), (g), (i), (k), and (m) of FIG. 4 represent a bright-field of the TEM, and (b), (d), (f), (h), (j), (l), and (n) of FIG. 4 represent a dark-field of TEM.

In addition, (o) and (q) of FIG. 4 represents an HRTEM image of the base structure provided in the process of preparing the catalyst structure according to above Example 1, and (q) and (r) of FIG. 4 represent an FFT pattern of the catalyst structure according to above Example 1 formed by heat treatment for 10 minutes.

As can be understood from (a) to (n) of FIG. 4, it could be confirmed that the catalyst structure has a core-shell structure, and the thickness of the shell increases as the heat treatment time increases. In addition, as can be understood from (o) to (q) of FIG. 4, it could be confirmed that lattice fingers with a d spacing of 4.7028, 3.3254, 2.8359, and 2.7151 A° correspond to (2 0 0), (0 2 2), (3 1 1), and (2 2 2) planes of the base structure ($Co_3O_4$).

Figure 5:
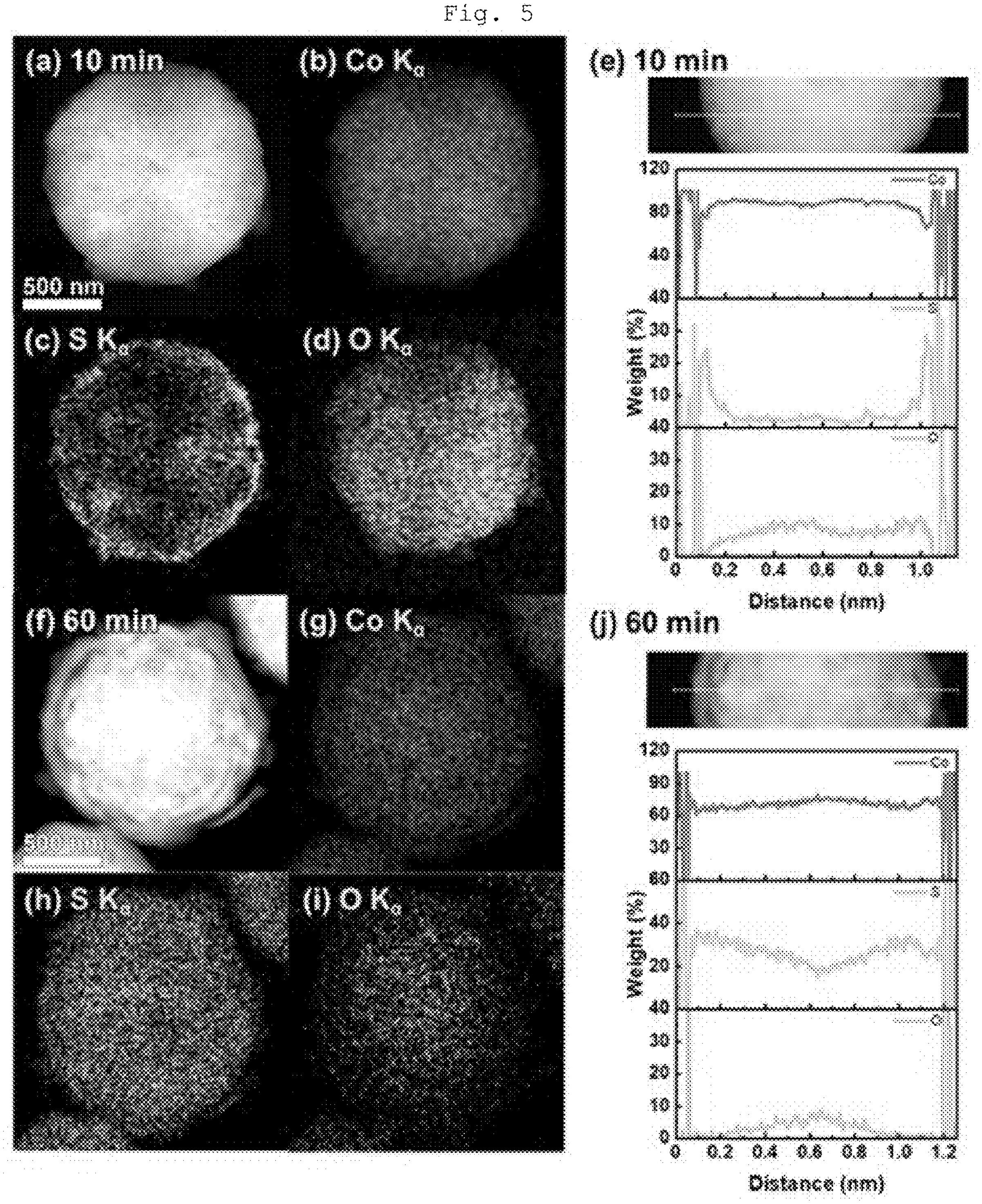
FIG. 5 is a view showing TEM images and EDS mapping images of a catalyst structure according to Example 1 of the present invention.

FIG. 5 is a view showing TEM images and EDS mapping images of a catalyst structure according to Example 1 of the present invention.

Referring to (a) of FIG. 5, a dark-field TEM image of the catalyst structure according to above Example 1 formed by heat treatment for 10 minutes is shown. Referring to (b) to (d) of FIG. 5, an EDS mapping image of the catalyst structure according to above Example 1 formed by heat treatment for 10 minutes is shown. Referring to (g) of FIG. 5, a dark-field TEM image of the catalyst structure according to above Example 1 formed by heat treatment for 60 minutes is shown. And, referring to (h) to (j) of FIG. 5, an EDS mapping image of the catalyst structure according to above Example 1 formed by heat treatment for 10 minutes is shown.

In addition, referring to (e) and (k) of FIG. 5, a line profile of the catalyst structure according to above Example 1 formed by heat treatment for 10 to 60 minutes is shown, respectively. And, referring to (f) and (l) of FIG. 5, a weight percentage of cobalt, oxygen, and sulfur in the catalyst structure according to above Example 1 formed by heat treatment for 10 to 60 minutes is shown, respectively.

As can be understood from (a) to (j) of FIG. 5, it could be confirmed that sulfur (S) is present only on the surface of the $Co_3O_4$ base structure, and an amount of sulfur (S) present on the surface increases as the heat treatment time increases.

Figure 6:
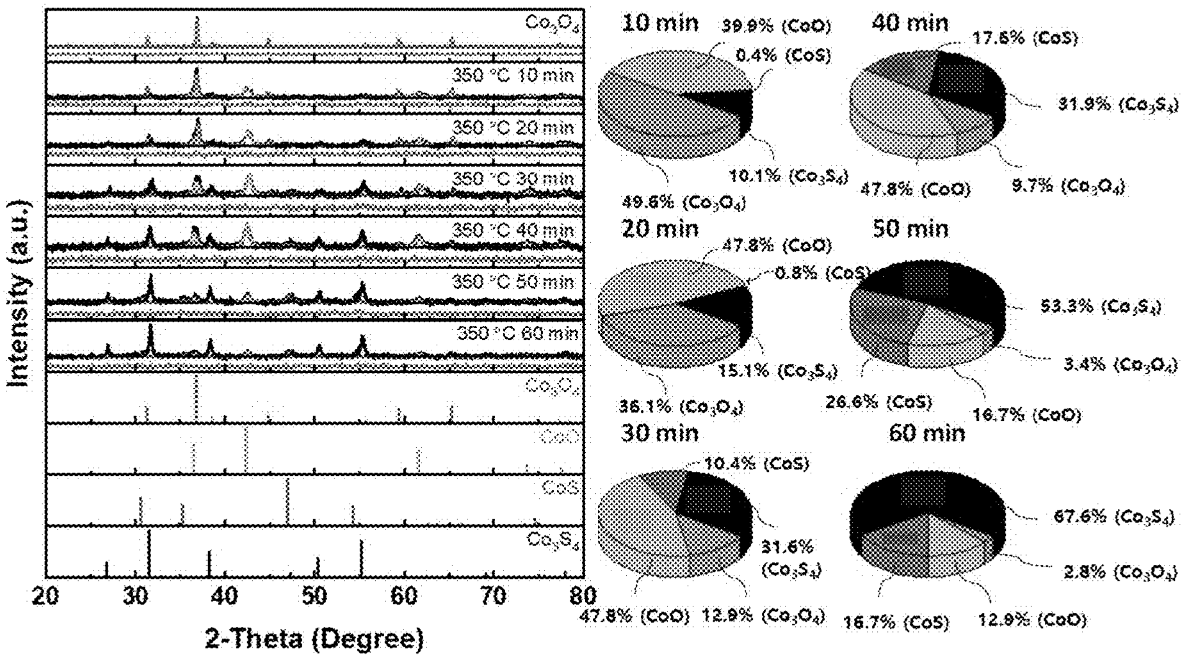
FIG. 6 is a view showing the results of XRD analysis of a catalyst structure and a base structure according to Example 1 of the present invention.

FIG. 6 is a view showing the results of XRD analysis of a catalyst structure and a base structure according to Example 1 of the present invention.

Referring to FIG. 6, X-ray diffraction (XRD) analysis was performed to measure the crystal structure, crystallinity, and phase of the base structure provided in the process of preparing the catalyst structure according to Example 1 and the catalyst structures according to Example 1 formed by controlling the heat-treatment time to be 10, 20, 30, 40, 50, and 60 minutes, and the results thereof are shown ($Co_3O_4$: red, CoO: orange, CoS: green, $Co_3S_4$: blue).

As can be understood from FIG. 6, it could be confirmed that all of the plurality of catalyst structures formed at different heat treatment times exhibit a diffraction peak of $Co_3O_4$ [JCPDS #42-1467], CoO [JCPDS #43-1004], CoS [JCPDS #73-1703] and $Co_3S_4$ [JCPDS #75-0605]. In addition, it could be confirmed that $Co_3O_4$ is converted to CoO, and peaks of CoS and $Co_3S_4$ newly appear as the base structure is heat-treated under hydrogen sulfide ($H_2S$).

The composition and grain size of the above-described base structure and a plurality of catalyst structures are summarized in <Table 3> below.

TABLE 3

| Classification | | $Co_3O_4$ | CoO | CoS | $Co_3S_4$ | GOF | $R_{wp}$ |
|---|---|---|---|---|---|---|---|
| Base structure | Grain size (nm) | 54.58 | — | — | — | 1.07 | 4.07 |
| Catalyst structure (10 minutes) | Ratio | 49.55% | 39.94% | 0.40% | 10.12% | 1.02 | 2.73 |
| | Grain size (nm) | 22.07 | 8.56 | — | 16.14 | | |
| Catalyst structure (20 minutes) | Ratio | 36.11% | 47.75% | 0.83% | 15.31% | 1 | 2.89 |
| | Grain size (nm) | 21.15 | 8.25 | — | 14.9 | | |
| Catalyst structure (30 minutes) | Ratio | 12.85% | 45.07% | 10.45% | 31.63% | 1.01 | 2.85 |
| | Grain size (nm) | 22.33 | 9.65 | 5.52 | 13.74 | | |
| Catalyst structure (40 minutes) | Ratio | 9.73% | 40.82% | 17.61% | 31.84% | 1.06 | 3.3 |
| | Grain size (nm) | 23.74 | 9.13 | 3.28 | 16.63 | | |
| Catalyst structure (50 minutes) | Ratio | 3.38% | 16.65% | 26.62% | 53.35% | 1.04 | 3.16 |
| | Grain size (nm) | 16.26 | 9.9 | 7.6 | 16.23 | | |
| Catalyst structure (60 minutes) | Ratio | 2.77% | 12.87% | 16.76% | 67.61% | 1.04 | 2.77 |
| | Grain size (nm) | 23.52 | 11.6 | 9.19 | 18.57 | | |

Figure 7:
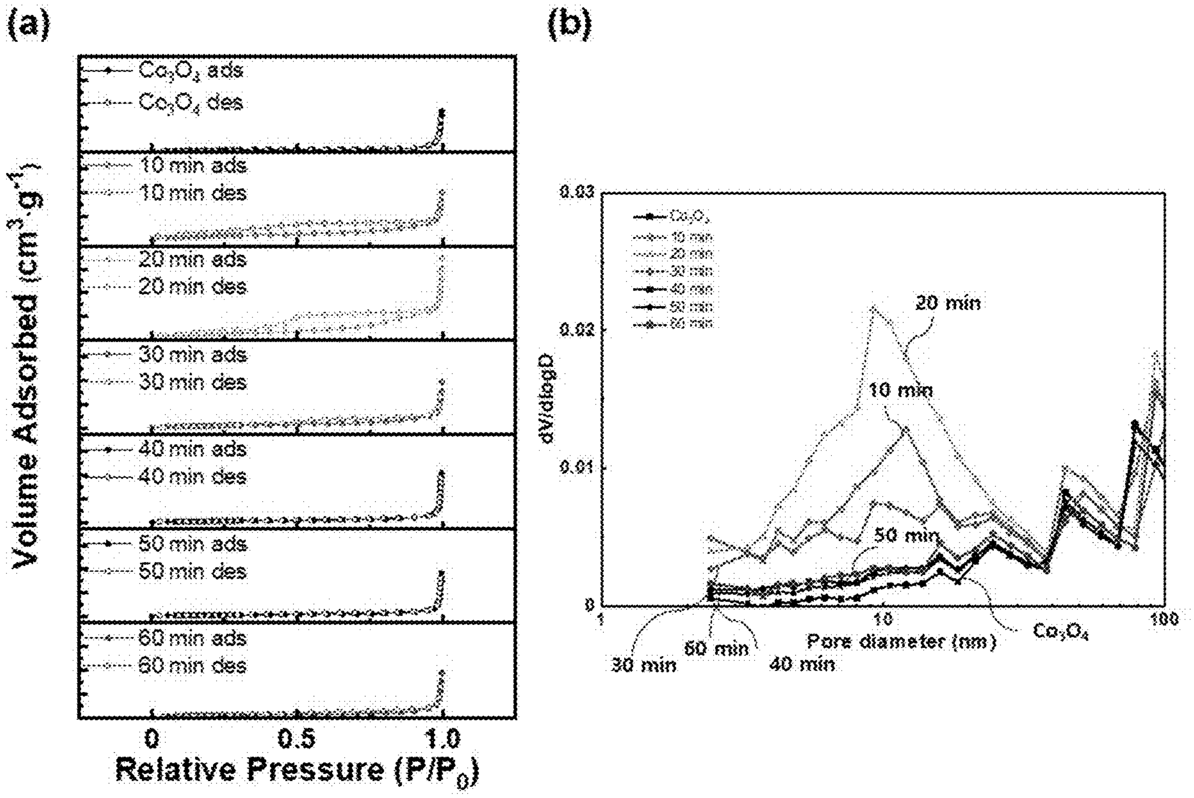
FIG. 7 is a graph showing an area of a catalyst structure and a base structure according to Example 1 of the present invention.

FIG. 7 is a graph showing an area of a catalyst structure and a base structure according to Example 1 of the present invention. Referring to (a) and (b) of FIG. 7, after providing the base structure provided in the process of preparing the catalyst structure according to above Example 1 and the catalyst structures according to above Example 1 formed by controlling the heat-treatment time to be 10, 20, 30, 40, 50, and 60 minutes, each surface area and pore size distribution were measured and shown. Specifically, the surface area was measured by using the Brunauer-Emmett-Teller (BET) method, and the pore size distribution was measured by using the Barrett-Joyner-Halenda (BJH) method. As can be understood from (a) to (b) of FIG. 7, it could be confirmed that the surface area and pore size distribution of the catalyst structure changes as the heat treatment time is changed.

Figure 8:
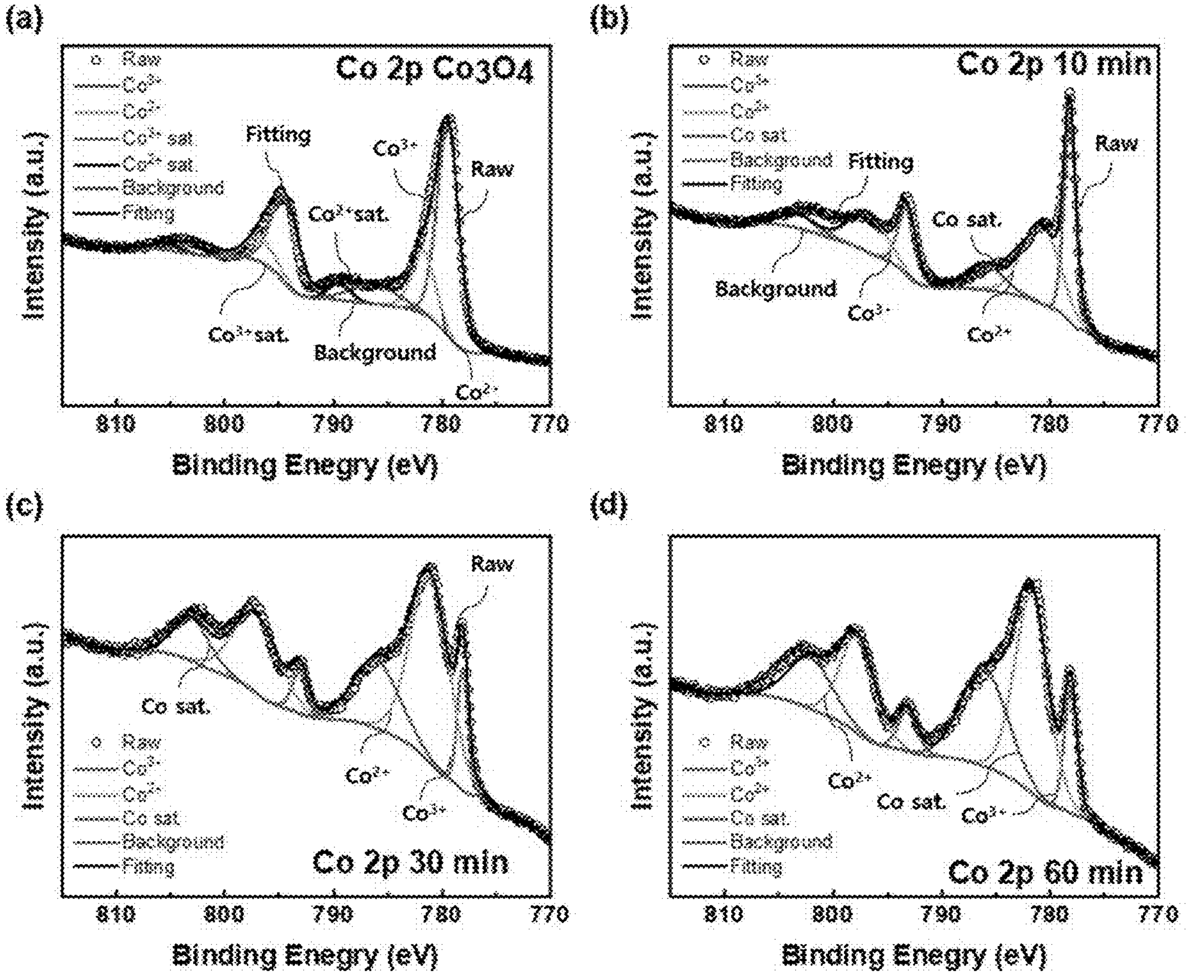
FIGS. 8 to 10 are views showing results of XPS analysis of a catalyst structure and a base structure according to Example 1 of the present invention.
Figure 9:
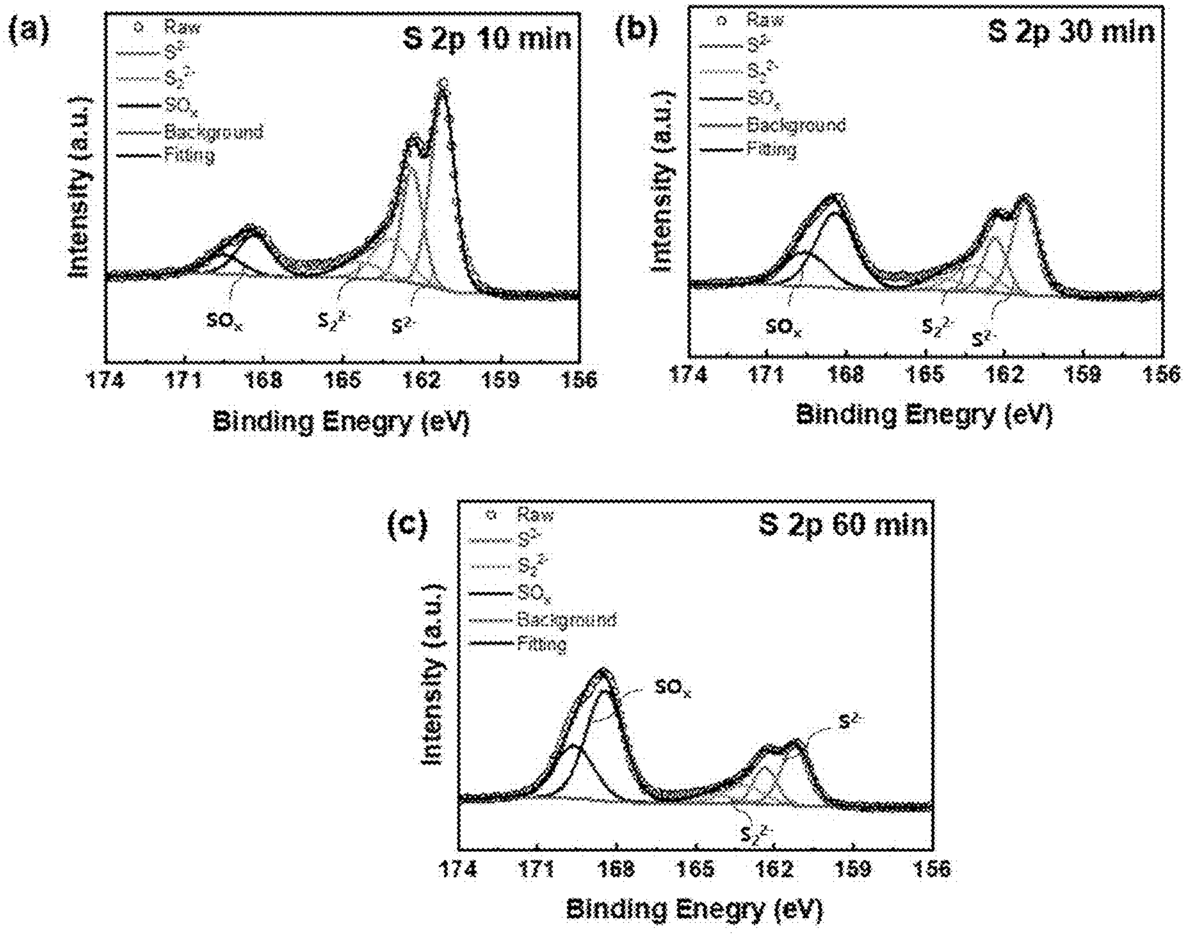
Figure 10:
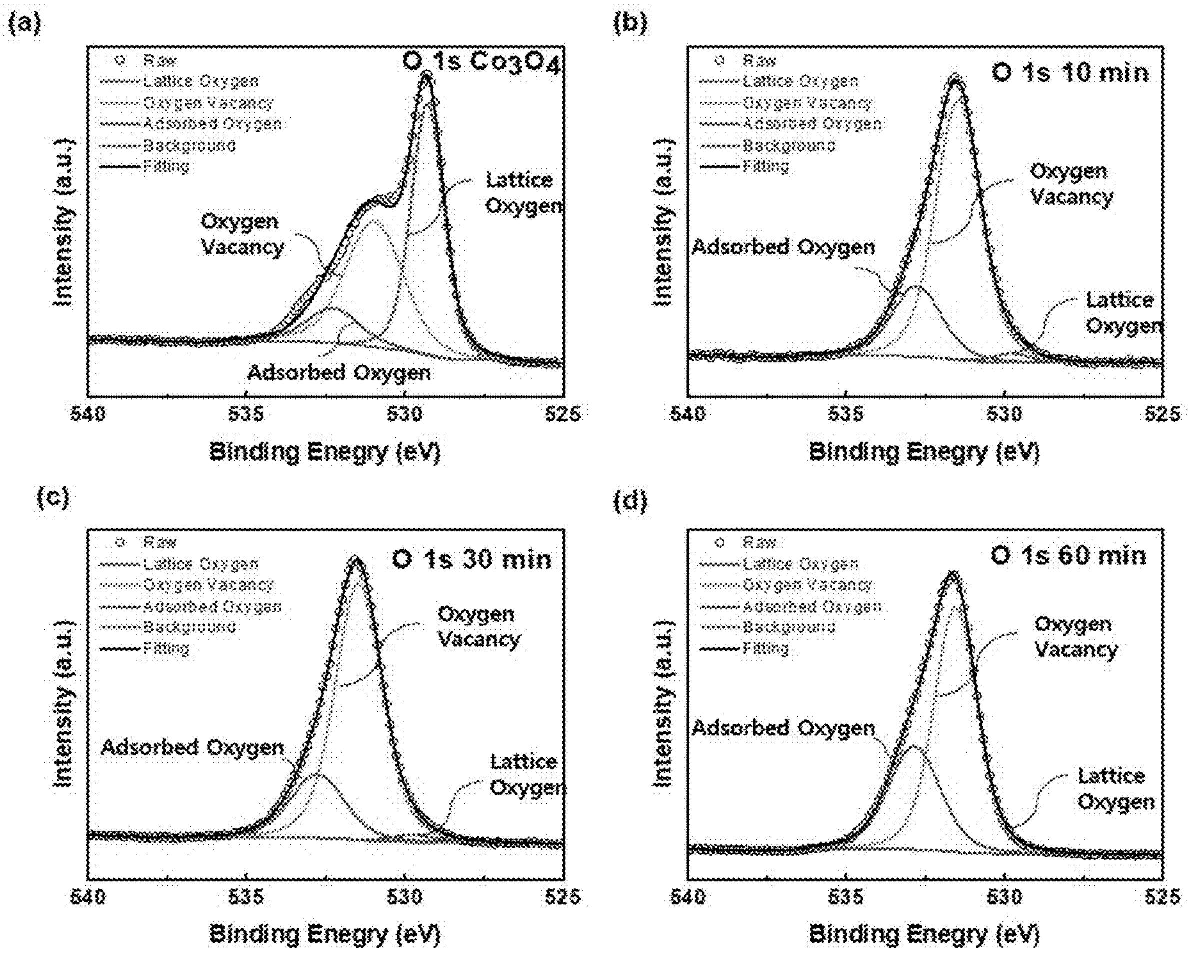

FIGS. 8 to 10 are views showing results of XPS analysis of a catalyst structure and a base structure according to Example 1 of the present invention.

Referring to (a) to (d) of FIG. 8, Co 2p spectra of the base structure provided in the process of preparing the catalyst structure according to above Example 1 and the catalyst structure according to above Example 1 formed by controlling the heat-treatment time to be 10, 30, and 60 minutes are shown.

Referring to (a) to (c) of FIG. 9, S 2p spectra of the catalyst structure according to above Example 1 formed by controlling the heat-treatment time to be 10, 30, and 60 minutes are shown.

Referring to (a) to (d) of FIG. 10, O 1s spectra of the base structure provided in the process of preparing the catalyst structure according to above Example 1 and the catalyst structure according to above Example 1 formed by controlling the heat-treatment time to be 10, 30, and 60 minutes are shown.

As can be understood from (a) to (d) of FIG. 8, it could be confirmed that the Co 2p spectrum is separated into a spin-orbital doublet, which is a property of $Co^{3+}$ and $Co^{2+}$, together with two satellite peaks. Alternatively, as can be understood from (a) of FIG. 8, it could be confirmed that the $Co_3O_4$ base structure shows a peak corresponding to $Co^{3+}$ at binding energy values of 779.5 eV and 794.6 eV, and a peak corresponding to $Co^{2+}$ at binding energy values of 781.8 eV and 797 eV. Alternatively, as can be understood from (b) to (d) of FIG. 8, it could be confirmed that the $Co_3O_4$—CoO/$Co_3S_4$—CoS catalyst structure shows a peak corresponding to $Co^{3+}$ at binding energy values of 778.2 eV and 793.3 eV, and a peak corresponding to $Co^{2+}$ at binding energy values of 780.9 eV and 796.8 eV. Alternatively, as can be understood from (a) to (c) of FIG. 9, Co—S bonding could be confirmed through a peak at 161.2 eV and 162.4 eV. Accordingly, it can be seen that the Co—S bond is formed, and $Co_3O_4$ is reduced and sulfided.

Manufacturing of a Three-Electrode System for Measuring Electrochemical Properties of Catalyst Structure According to Example 1

The electrochemical properties in the oxygen evolution reaction (OER) were measured by forming three electrodes with a glassy carbon (GC) working electrode including an active catalyst, a Pt wire counter electrode, and a Hg/HgO reference electrode, and by using linear sweep voltammetry (LSV) with KOH at a 1 M concentration and a scan rate of 10 mv/s.

In the process of manufacturing working electrodes, specifically, 5 mg of an active catalyst, a solvent of DI water and ethanol mixed at a ratio of 1:1, and 5 wt % of Nafion were subjected to sonication for two hours, thereby preparing a solution. 10 μL of the prepared solution was added dropwise to polished glassy carbon (GC) having a diameter of 3 mm and dried at room temperature to prepare a working electrode.

A base structure ($Co_3O_4$) provided in the process of preparing the catalyst structure according to Example 1, $Co_3O_4$/CoO structure, catalyst structures according to above Example 1 formed by controlling the heat-treatment time to be 10, 20, 30, 40, 50, and 60 minutes, and iridium oxide ($IrO_2$) were used as an active catalyst. Alternatively, as a control group, glassy carbon (GC) without containing an active catalyst was used as a working electrode.

Figure 11:
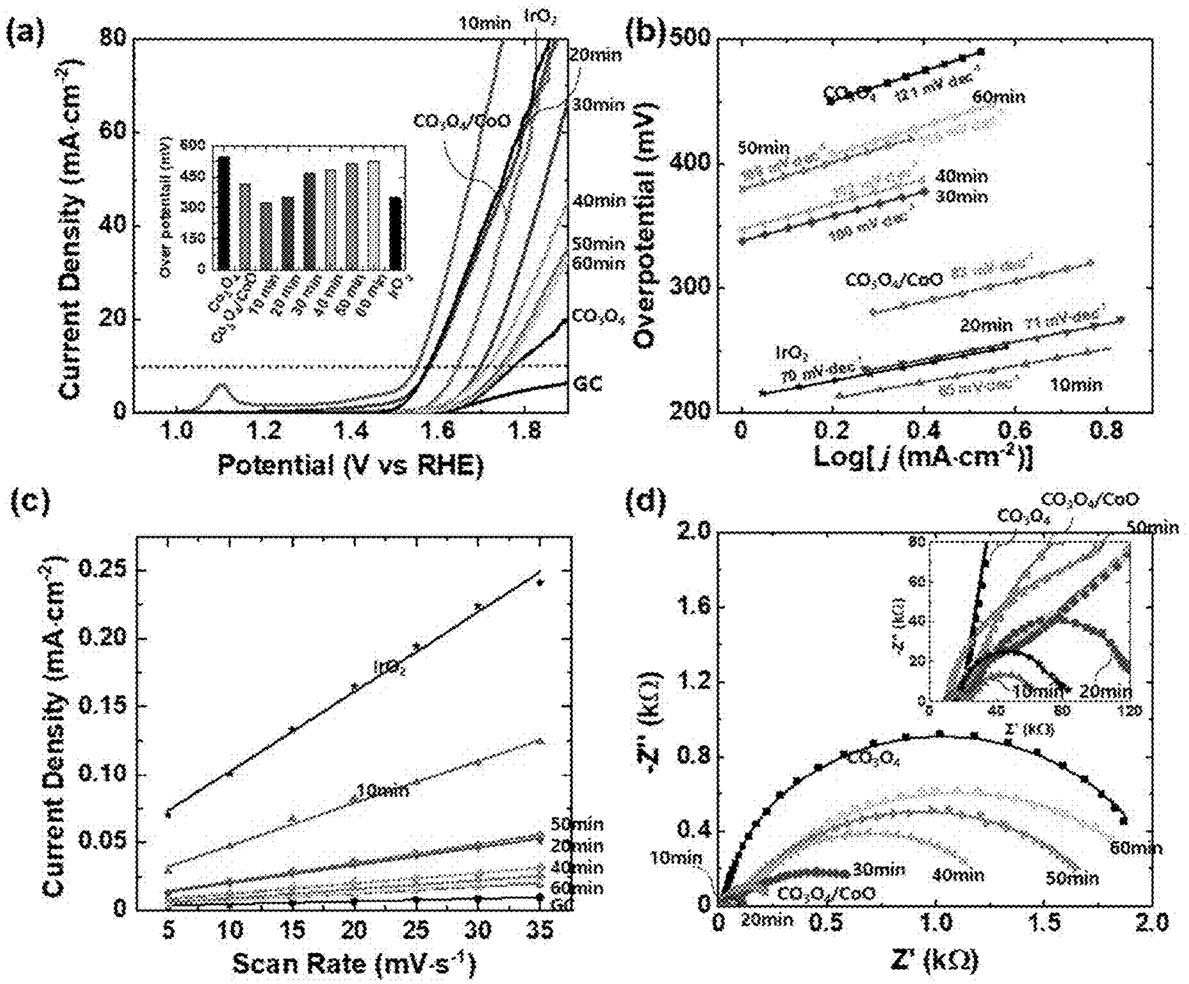
FIG. 11 is a view showing the electrochemical properties of a catalyst structure and a base structure according to Example 1 of the present invention.

FIG. 11 is a view showing the electrochemical properties of a catalyst structure and a base structure according to Example 1 of the present invention.

(a) of FIG. 11 shows polarization curves, (b) of FIG. 11 shows a Tafel plot, (c) of FIG. 11 shows a change in current density according to a scan rate, and (d) of FIG. 11 shows a Nyquist plot.

As can be understood from (a) of FIG. 11, it could be confirmed that overpotentials of 546 mV and 416 mV appear when the $Co_3O_4$ base structure according to above Example 1, and the $Co_3O_4/Co_0$ structure are used as active catalysts. In addition, it could be confirmed that overpotentials of 320 mV, 350 mV, 469 mV, 486 mV, 513 mV, and 526 mV appear when catalyst structures according to above Example 1 formed by heat treatment for 10, 20, 30, 40, 50, and 60 minutes are used as active catalysts. Furthermore, it could be confirmed that an overpotential of 347 mV appears when the iridium oxide ($IrO_2$) is used as an active catalyst.

In particular, it could be seen that the catalyst structure (320 mV) according to above Example 1 formed by heat treatment for 10 minutes shows an overpotential lower than that of the iridium oxide (347 mV), thus providing excellent electrochemical properties.

As can be understood from (b) of FIG. 11, it could be confirmed that Tafel slope values of 121 mV/dec and 83 mV/dec appear when the $Co_3O_4$ base structure according to above Example 1 and the $Co_3O_4$/CoO structure are used as active catalysts. In addition, it could be confirmed that Tafel slope values of 65 mV/dec, 71 mV/dec, 100 mV/dec, 102 mV/dec, 109 mV/dec, and 115 mV/dec appear when catalyst structures according to the above Example 1 formed by heat treatment for 10, 20, 30, 40, 50, and 60 minutes are used as active catalysts. Furthermore, it could be confirmed that a Tafel slope value of 70 mV/dec appears when the iridium oxide ($IrO_2$) is used as an active catalyst.

In particular, it could be seen that the catalyst structure (65 mV/dec) according to above Example 1 formed by heat treatment for 10 minutes shows a Tafel slope value lower than that of the iridium oxide (70 mV/dec), thus providing excellent electrochemical properties.

As can be understood from (d) of FIG. 11, it could be confirmed that charge transfer resistance values of 2044Ω and 222.4Ω appear when the $Co_3O_4$ base structure according to above Example 1, and the $Co_3O_4$/CoO structure are used as active catalysts. In addition, it could be confirmed that charge transfer resistance values of 42 Ω, 103 Ω, 882 Ω, 1300 Ω, 1720Ω, and 1894Ω appear when catalyst structures according to above Example 1 formed by heat treatment for 10, 20, 30, 40, 50, and 60 minutes are used as active catalysts. Furthermore, it could be confirmed that a charge transfer resistance value of 59Ω appears when the iridium oxide ($IrO_2$) is used as an active catalyst.

In particular, it could be seen that the catalyst structure (42Ω) according to above Example 1 formed by heat treatment for 10 minutes shows a charge transfer resistance value lower than that of the iridium oxide (59Ω), thus providing excellent electrochemical properties.

The values measured in FIG. 11 are summarized in <Table 4> below.

TABLE 4

| Classification | Tafel slope mV/dec | Over-potential(η) mV at 10 mA $cm^{-2}$ | Exchange current density $j_0$ mA $cm^{-2}$@over-potential(η) = 0 | Charge transfer resistance $R_{ct}$ ohm |
|---|---|---|---|---|
| Base structure | 121 | 546 | 0.301 | 2044 |
| Catalyst structure (10 minutes) | 65 | 320 | 1.258 | 42.7 |
| Catalyst structure (20 minutes) | 71 | 350 | 0.971 | 103.7 |
| Catalyst structure (30 minutes) | 100 | 469 | 0.467 | 882.5 |
| Catalyst structure (40 minutes) | 102 | 486 | 0.396 | 1300 |

TABLE 4-continued

| Classification | Tafel slope mV/dec | Over-potential(η) mV at 10 mA $cm^{-2}$ | Exchange current density $j_0$ mA $cm^{-2}$@over-potential(η) = 0 | Charge transfer resistance $R_{ct}$ ohm |
|---|---|---|---|---|
| Catalyst structure (50 minutes) | 109 | 513 | 0.333 | 1720 |
| Catalyst structure (60 minutes) | 115 | 526 | 0.329 | 1894 |
| Iridium oxide ($IrO_2$) | 70 | 347 | 0.926 | 59.7 |

In addition, the turnover frequency (TOF) of the above-described active catalysts at an overpotential of 400 mV was calculated according to <Equation 1> below, and the results thereof are summarized in <Table 5> below. <Equation 1>

$$TOF = j \times A / 4 \times F \times n$$

(j: Geometric current density measured at an overpotential of 400 mV, A: Surface area of GC working electrode, F: Faraday constant, n: Number of moles of active catalyst provided to GC working electrode)

TABLE 5

| Classification | TOF($S^{-1}$) η = 400 mV |
|---|---|
| Base structure | $2.3 \times 10^{-4}$ |
| Catalyst structure (10 minutes) | $1.3 \times 10^{-2}$ |
| Catalyst structure (20 minutes) | $8.1 \times 10^{-3}$ |
| Catalyst structure (30 minutes) | $1.0 \times 10^{-3}$ |
| Catalyst structure (40 minutes) | $1.2 \times 10^{-3}$ |
| Catalyst structure (50 minutes) | $1.2 \times 10^{-3}$ |
| Catalyst structure (60 minutes) | $8.35 \times 10^{-4}$ |
| Iridium oxide ($IrO_2$) | $2.4 \times 10^{-2}$ |

As a result, it can be seen that the properties of the electrochemical catalyst may be improved by controlling the heat treatment temperature of the base structure to be 10 minutes or less in the process of preparing the electrochemical catalyst according to an embodiment of the present invention. In particular, as can be understood from <Table 2> and <Table 3> described above, it can be seen that the catalyst structure according to Example 1 formed at a heat treatment temperature of 10 minutes includes 49 wt % or more of $Co_3O_4$, 40 wt % or less of CoO, 11% or less of $Co_3S_4$, and 0.5% or less of CoS, and average pore size is 12 nm or less. FIGS. 12 to 15 are graphs showing electrochemically active surface areas of a catalyst structure and a base structure according to Example 1 of the present invention.

Referring to FIGS. 12 to 15, the electrochemical active surface areas (ECSA) of the active catalyst were calculated by extracting a double-layer capacitance ($C_{dl}$) through cyclic voltammetry (CV) measurement in the cases of not applying an active catalyst, applying the base structure ($Co_3O_4$) according to above Example 1 as an active catalyst, applying the $Co_3O_4$/CoO structure as an active catalyst, applying the catalyst structures according to above Example 1 formed by controlling the heat-treatment time to be 10, 20, 30, 40, 50, and 60 minutes, and applying the iridium oxide ($IrO_2$) as an active catalyst.

The electrochemical active surface areas (ECSA) were calculated through <Equation 2> and <Equation 3>.

$$ECSA = R_f \times A \quad \text{<Equation 2>}$$

$R_f = C_{dl}/C_s$ <Equation 3>

(Rf: Roughness coefficient calculated from the ratio of double-layer capacitance ($C_{dl}$) of each active catalyst and GC working electrode ($C_s$), A: Geometric area of GC working electrode surface (0.07 $cm^2$))

Figure 12:
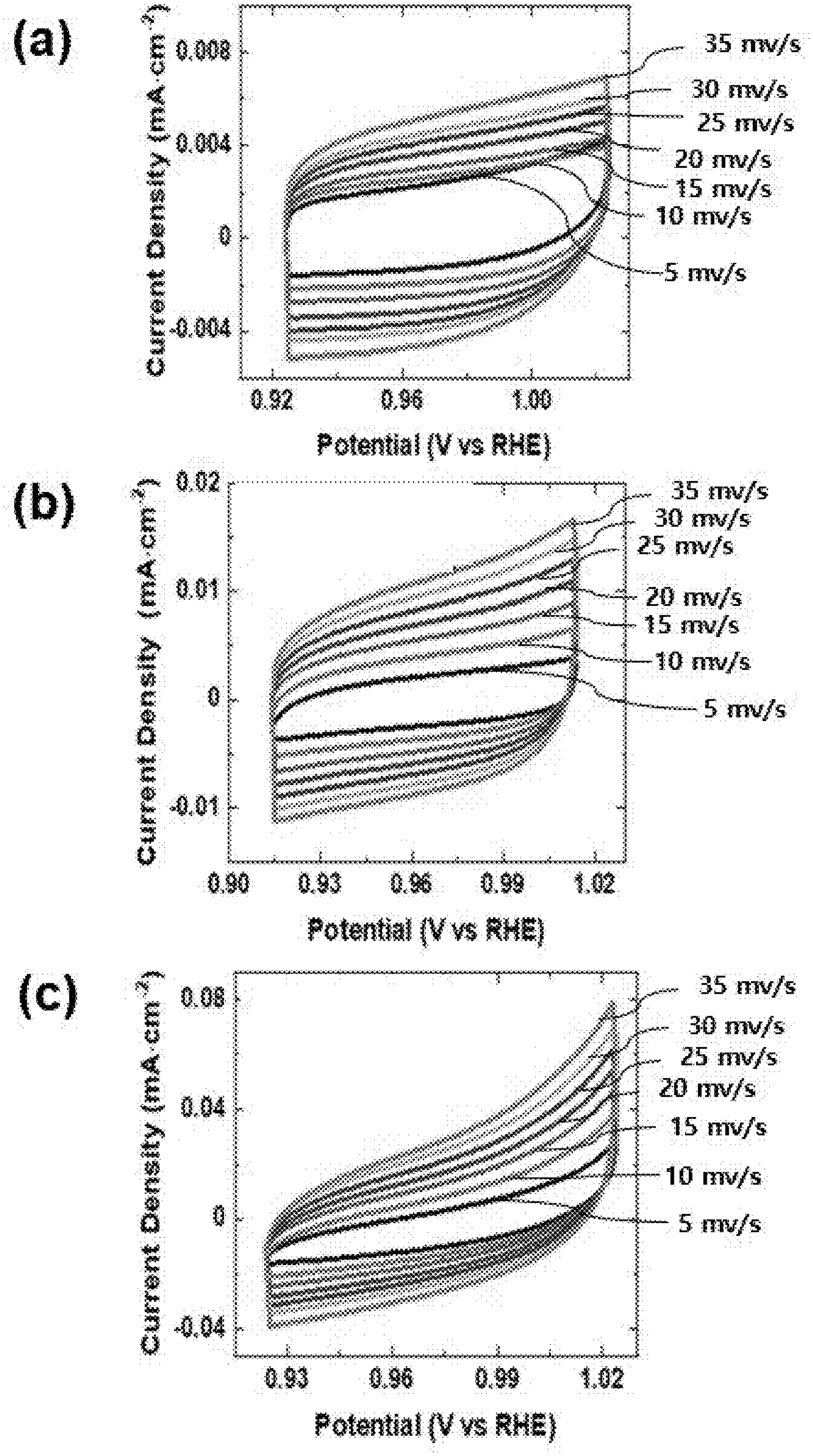
FIGS. 12 to 15 are graphs showing electrochemically active surface areas of a catalyst structure and a base structure according to Example 1 of the present invention.
Figure 13:
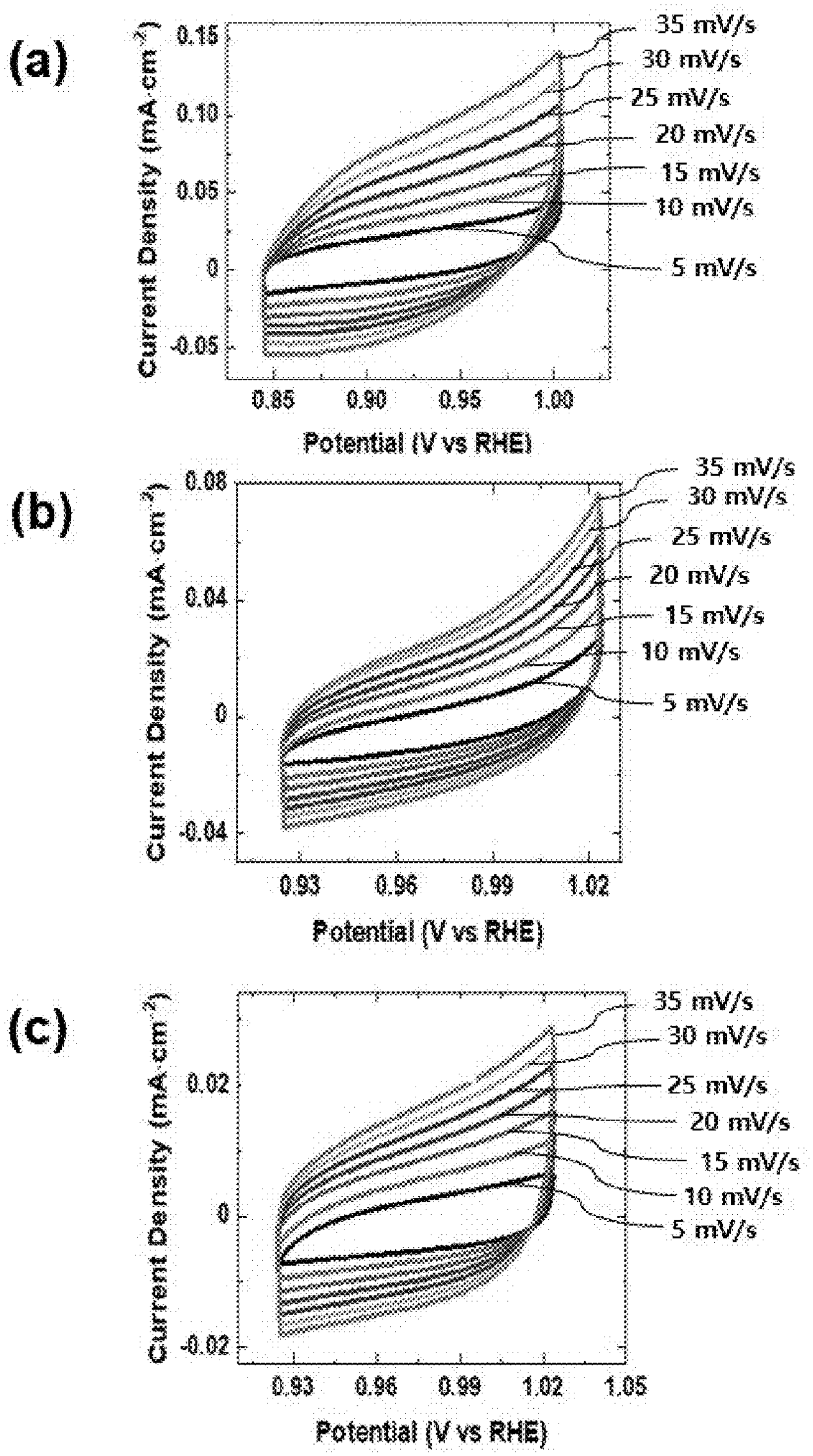
Figure 14:
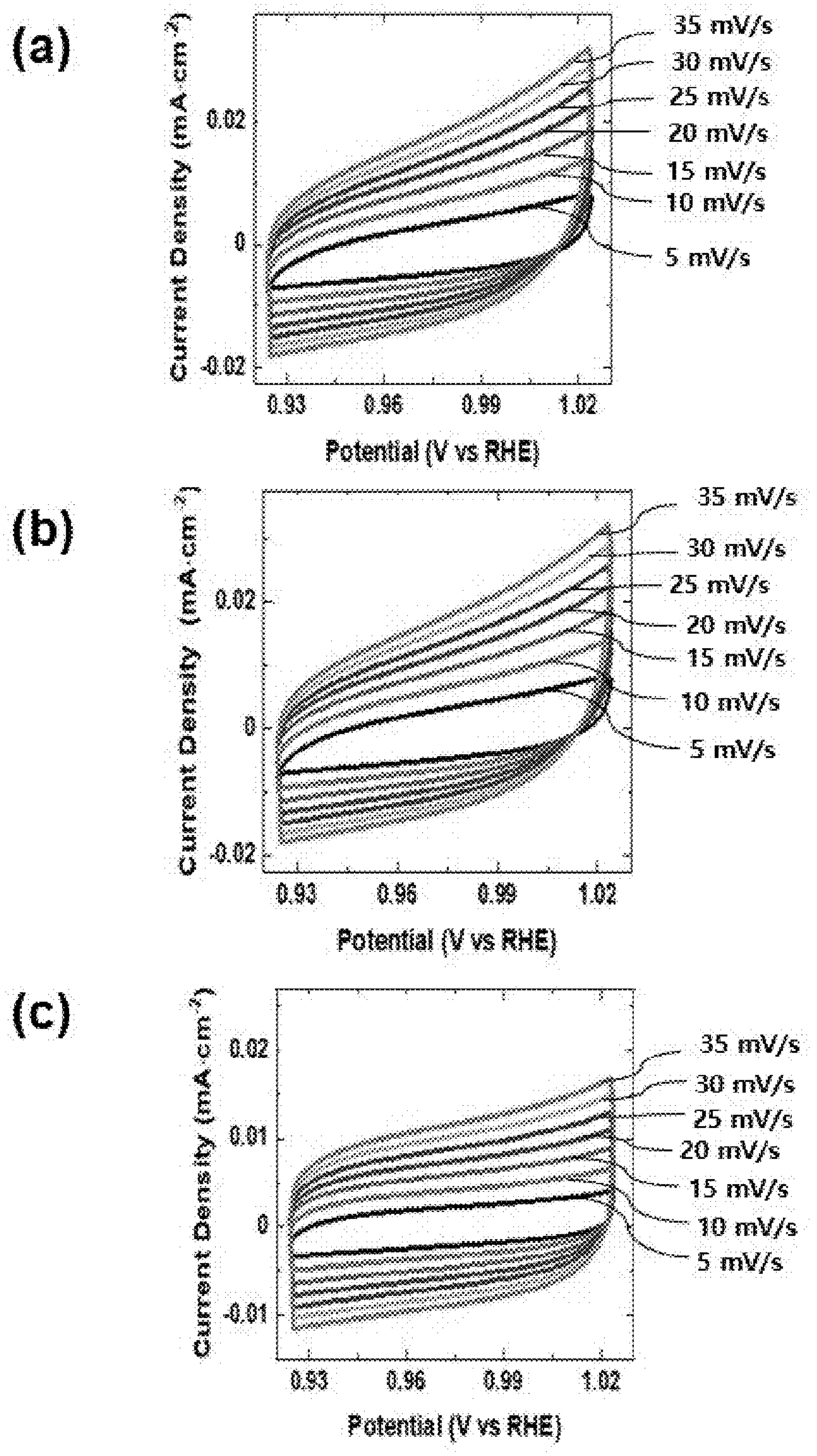
Figure 15:
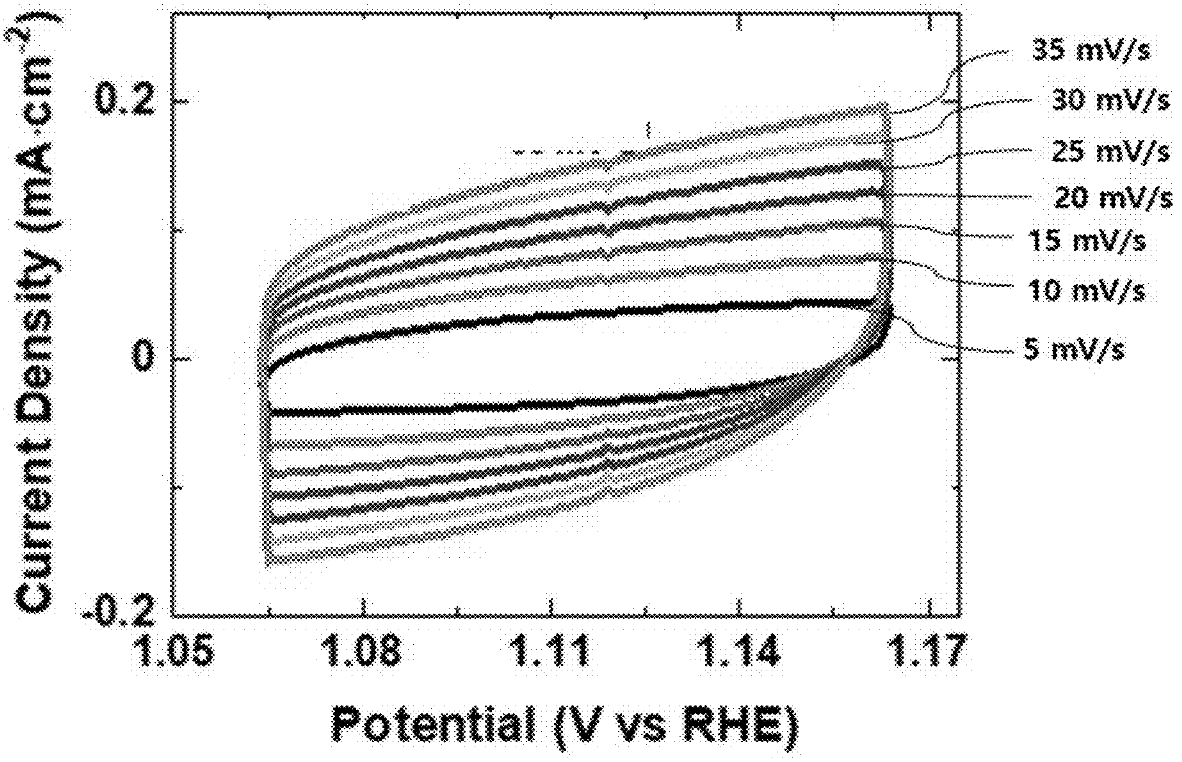

Specifically, (a) to (c) of FIG. 12 show the cases of not applying an active catalyst, applying the $Co_3O_4$ base structure according to above Example 1 as an active catalyst, and applying the $Co_3O_4$/CoO structure as an active catalyst. (a) to (c) of FIG. 13 show the case of applying the catalyst structure according to above Example 1 formed by heat treatment for 10, 20, and 30 minutes as an active catalyst. (a) to (c) of FIG. 14 show the case of applying the catalyst structure according to above Example 1 formed by heat treatment for 40, 50, and 60 minutes as an active catalyst. FIG. 14 shows the case of applying the iridium oxide ($IrO_2$) as an active catalyst. The measured values are summarized in <Table 6> below.

TABLE 6

| Classification | Slope (mF $cm^{-2}$) | $C_{dl}$ (mF $cm^{-2}$) | Rf | ECSA $cm^2$ |
|---|---|---|---|---|
| Active catalyst X | 0.204 | 0.102 | — | — |
| Base structure | 0.492 | 0.246 | 2.4 | 0.16 |
| $Co_3O_4$/CoO | 1.38 | 0.69 | 6.76 | 0.47 |
| Catalyst structure (10 minutes) | 3.12 | 1.56 | 15.3 | 1.07 |
| Catalyst structure (20 minutes) | 1.31 | 0.655 | 6.4 | 0.45 |
| Catalyst structure (30 minutes) | 0.762 | 0.381 | 3.7 | 0.26 |
| Catalyst structure (40 minutes) | 0.740 | 0.370 | 3.6 | 0.25 |
| Catalyst structure (50 minutes) | 0.658 | 0.329 | 3.2 | 0.22 |
| Catalyst structure (60 minutes) | 0.533 | 0.266 | 2.6 | 0.18 |
| $IrO_2$ | 5.86 | 2.93 | 28.7 | 2.0 |

Figure 16:
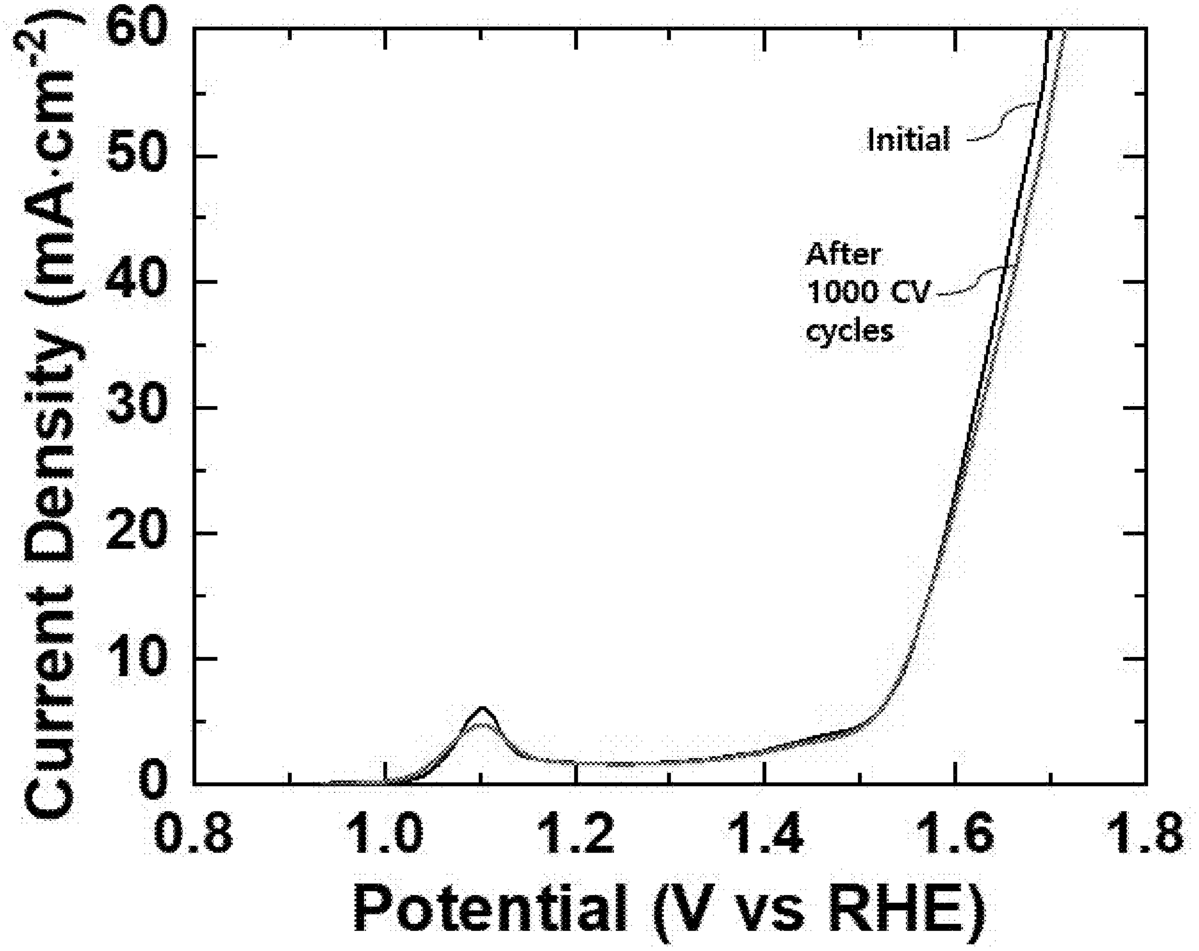
FIG. 16 is a graph showing the stability of a catalyst structure according to Example 1 of the present invention.

As can be understood from <Table 6>, it could be confirmed that the ECSA value and the number of active sites significantly decrease as the heat treatment time increases. FIG. 16 is a graph showing the stability of a catalyst structure according to Example 1 of the present invention.

Referring to FIG. 16, the catalyst structure according to above Example 1 formed by heat treatment for 10 minutes may be prepared. After preparing a three-electrode system in which the provided catalyst structure was applied as an active catalyst, 1000 CV cycles were performed from 1.23V to 1.63V (RHE) at a scan rate of 100 mv/s.

As can be understood from FIG. 16, it could be confirmed that the current density at 1.7V decreases by about 10% from 60.05 mA/$cm^2$ to 54.1 mA/$cm^2$ during 1000 CV cycles. In other words, it could be confirmed that the catalyst structure according to above Example 1 formed by heat treatment for 10 minutes has high stability.

Figure 17:
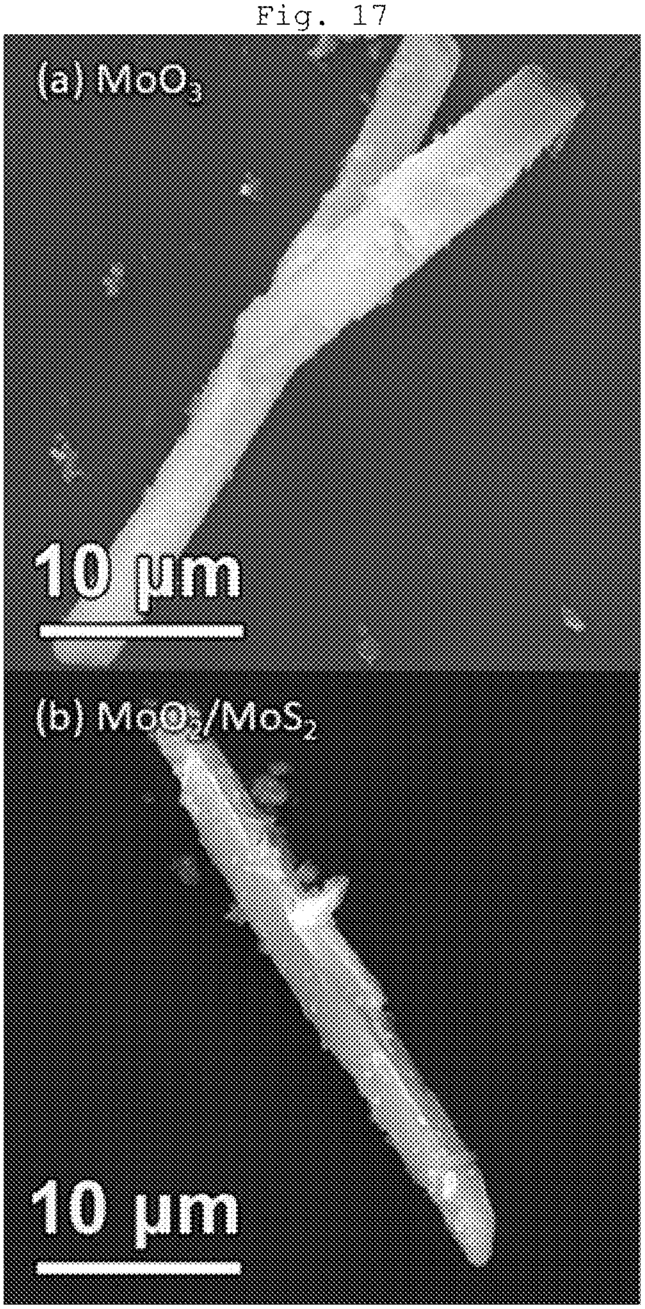
FIG. 17 is a view showing FE-SEM images of a catalyst structure and a base structure according to Example 2 of the present invention.
Figure 18:
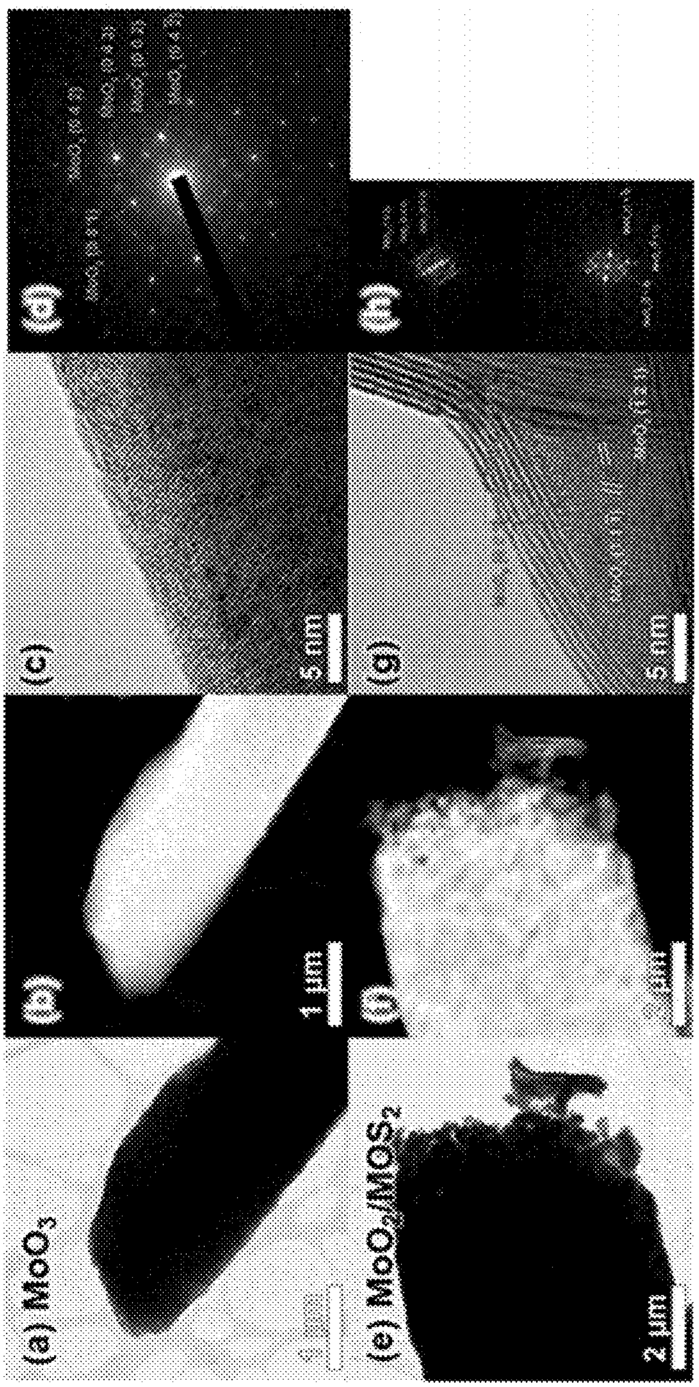
FIG. 18 is a view showing TEM images of a catalyst structure and a base structure according to Example 2 of the present invention.
Figure 19:
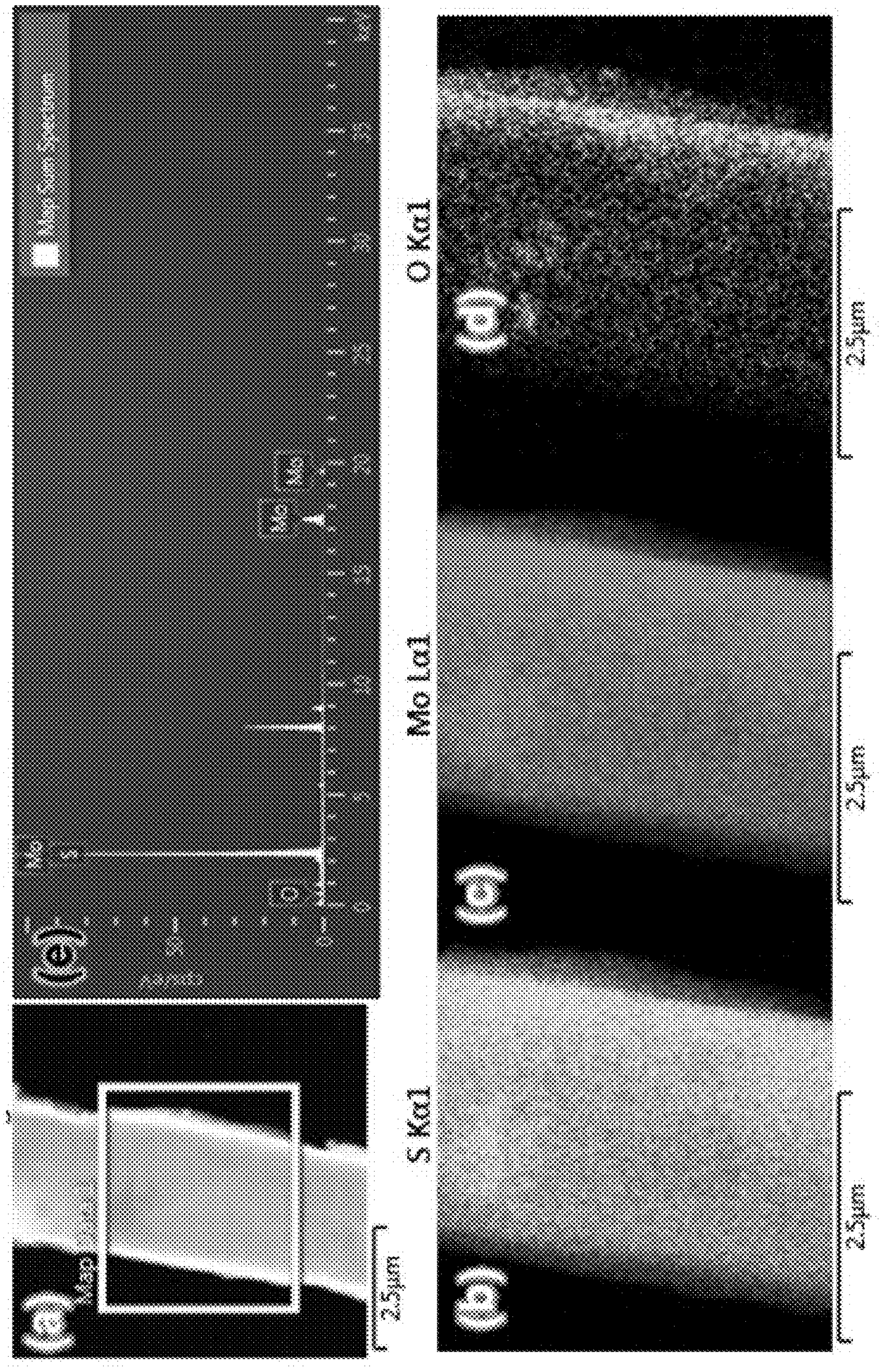
FIG. 19 is a view showing EDS mapping images of a catalyst structure according to Example 2 of the present invention.

FIG. 17 is a view showing FE-SEM images of a catalyst structure and a base structure according to Example 2 of the present invention, FIG. 18 is a view showing TEM images of a catalyst structure and a base structure according to Example 2 of the present invention, and FIG. 19 is a view showing EDS mapping images of a catalyst structure according to Example 2 of the present invention.

Referring to (a) of FIG. 17, an FE-SEM image of the base structure ($MoO_3$) according to above Example 2 is shown and referring to (b) of FIG. 17, an FE-SEM image of the catalyst structure ($MoO_2$/$MoS_2$) according to above Example 2 is shown. As can be understood from (a) and (b) of FIG. 17, it could be confirmed that the $MoO_3$ base structure has a rod shape, and a $MoS_2$ shell is formed on the surface of the base structure as the base structure is heat-treated under a hydrogen sulfide ($H_2S$) atmosphere.

Referring to (a) and (e) of FIG. 18, bright-field TEM images of the base structure ($MoO_3$) and the catalyst structure ($MoO_2$/$MoS_2$) according to above Example 2 are shown, and referring to (b) and (f) of FIG. 18, dark-field TEM images of the base structure ($MoO_3$) and the catalyst structure ($MoO_2$/$MoS_2$) according to above Example 2 are shown. In addition, referring to (c) and (g) of FIG. 18, HRTEM images of the base structure (MoO3) and the catalyst structure ($MoO_2$/$MoS_2$) according to above Example 2 are shown, and referring to (d) and (h) of FIG. 18, FFT patterns of the base structure ($MoO_3$) and the catalyst structure ($MoO_2$/$MoS_2$) according to above Example 2 are shown. As can be understood from (a) to (h) of FIG. 18, it could be confirmed that the catalyst structure according to above Example 2 has a structure of $MoO_2$ core structure/$MoS_2$ shell structure.

Referring to (a) to (e) of FIG. 19, EDS mapping images of the catalyst structure according to above Example 2 are shown. As can be understood from (a) to (e) of FIG. 19, it could be confirmed that the catalyst structure according to above Example 2 is formed with sulfur (S), molybdenum (Mo), and oxygen (O).

Figure 20:
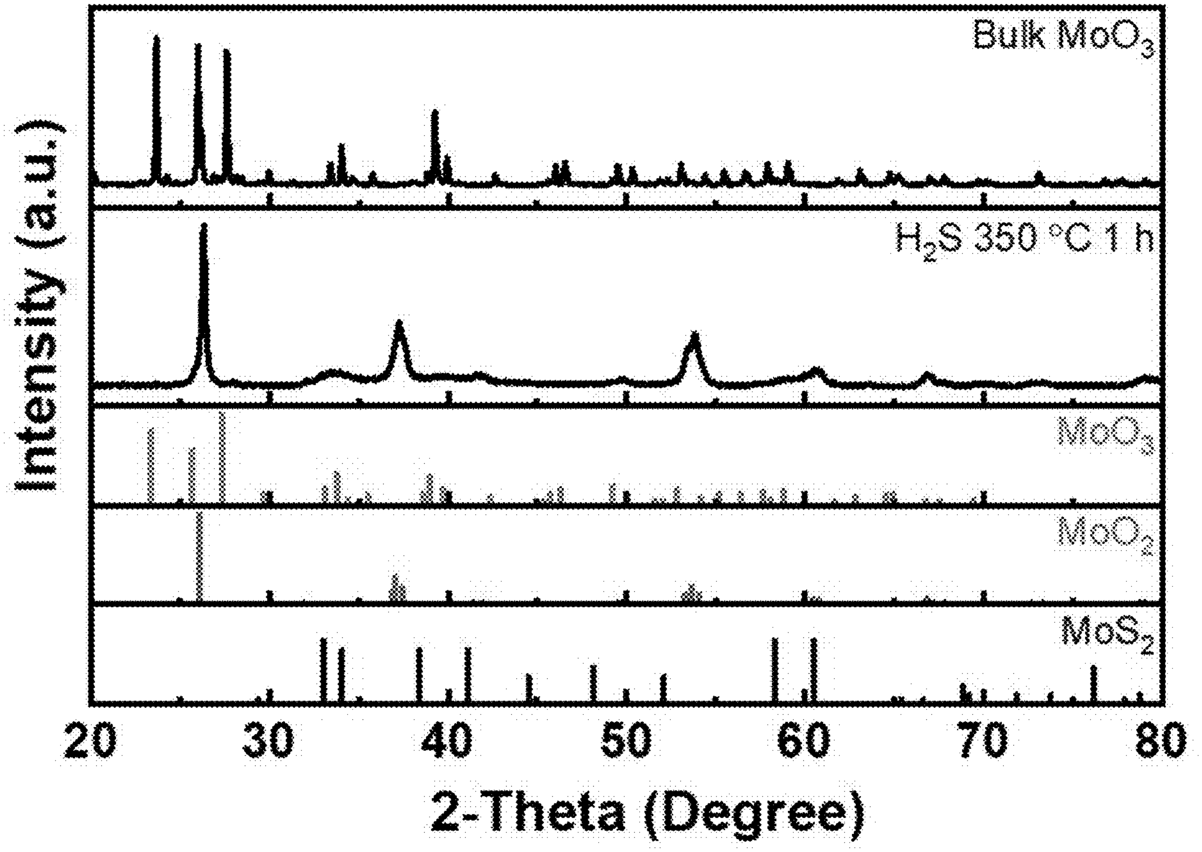
FIG. 20 is a view showing the results of XRD analysis of a catalyst structure and a base structure according to Example 2 of the present invention.
Figure 21:
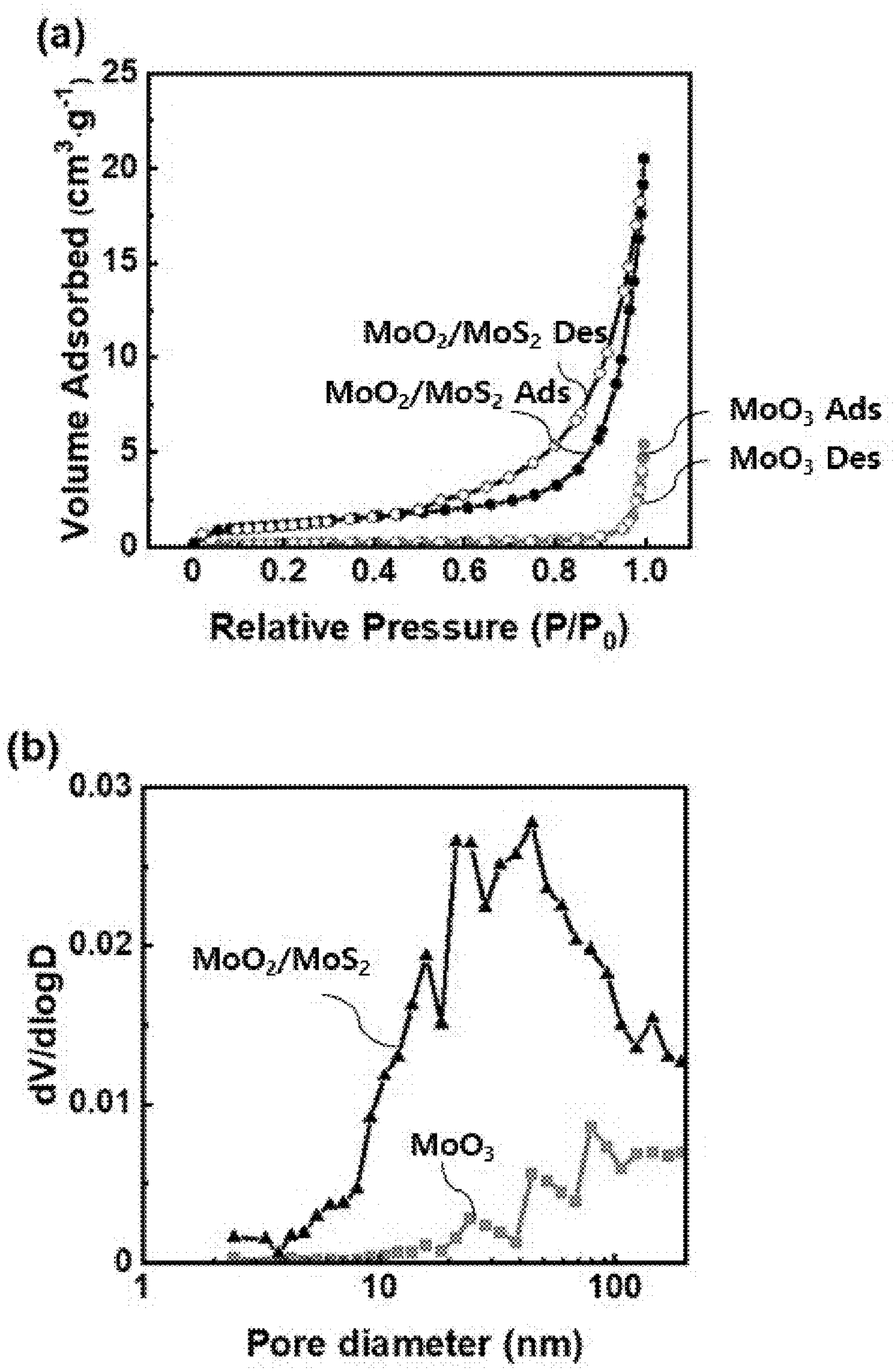
FIG. 21 is a view showing an area of a catalyst structure and a base structure according to Example 2 of the present invention.

FIG. 20 is a view showing results of XRD analysis of a catalyst structure and a base structure according to Example 2 of the present invention, and FIG. 21 is a view showing an area of a catalyst structure and a base structure according to Example 2 of the present invention.

Referring to FIG. 20, an XRD analysis was performed on the base structure ($MoO_3$) and the catalyst structure ($MoO_2$/$MoS_2$) according to above Example 2, and the results thereof are shown ($MoO_3$: red, $MoO_2$: green, $MoS_2$: blue). As can be understood from FIG. 20, it could be confirmed that $MoS_3$ is changed to $MoS_2$ and thus $MoS_2$ is produced as the base structure is heat-treated in a hydrogen sulfide ($H_2S$) atmosphere.

Referring to (a) of FIG. 21, a surface area of the base structure ($MoO_3$) and the catalyst structure ($MoO_2$/$MoS_2$) according to above Example 2 was measured and shown by using the Brunauer-Emmett-Teller (BET) method, and referring to (b) of FIG. 21, a pore size distribution of the base structure ($MoO_3$) and the catalyst structure ($MoO_2$/$MoS_2$) according to above Example 2 was measured and shown by using the Barrett-Joyner-Halenda (BJH) method. The measured results are summarized in <Table 7> below.

TABLE 7

| Classification | $a_{s, BET}$ ($m^2$/g) | Total pore volume ($p/p_0$ = 0.990) ($cm^3$/g) | Mean pore diameter (nm) |
|---|---|---|---|
| Base structure | 0.656 | 0.005 | 33 |
| Catalyst structure | 4.521 | 0.027 | 24.2 |

As can be understood from <Table 7>, it could be confirmed that a surface area ($a_{s,BET}$) is widened and a mean pore diameter is decreased as the base structure is heat-treated under hydrogen sulfide ($H_2S$).

Manufacturing of a Three-Electrode System for Measuring Electrochemical Properties of Catalyst Structure According to Example 2

The electrochemical properties in the hydrogen evolution reaction (HER) were measured by forming three electrodes with a glassy carbon (GC) working electrode including an active catalyst, a Pt gauze counter electrode, and a saturated calomel electrode (SCE) as a reference electrode, and by using CHI 660D at $H_2SO_4$ at a 0.5 M concentration.

The base structure ($MoO_3$) and the catalyst structure ($MoO_2/MoS_2$) according to above Example 2 were used as active catalysts. Alternatively, as a control group, glassy carbon (GC) without containing an active catalyst was used as a working electrode.

Figure 22:
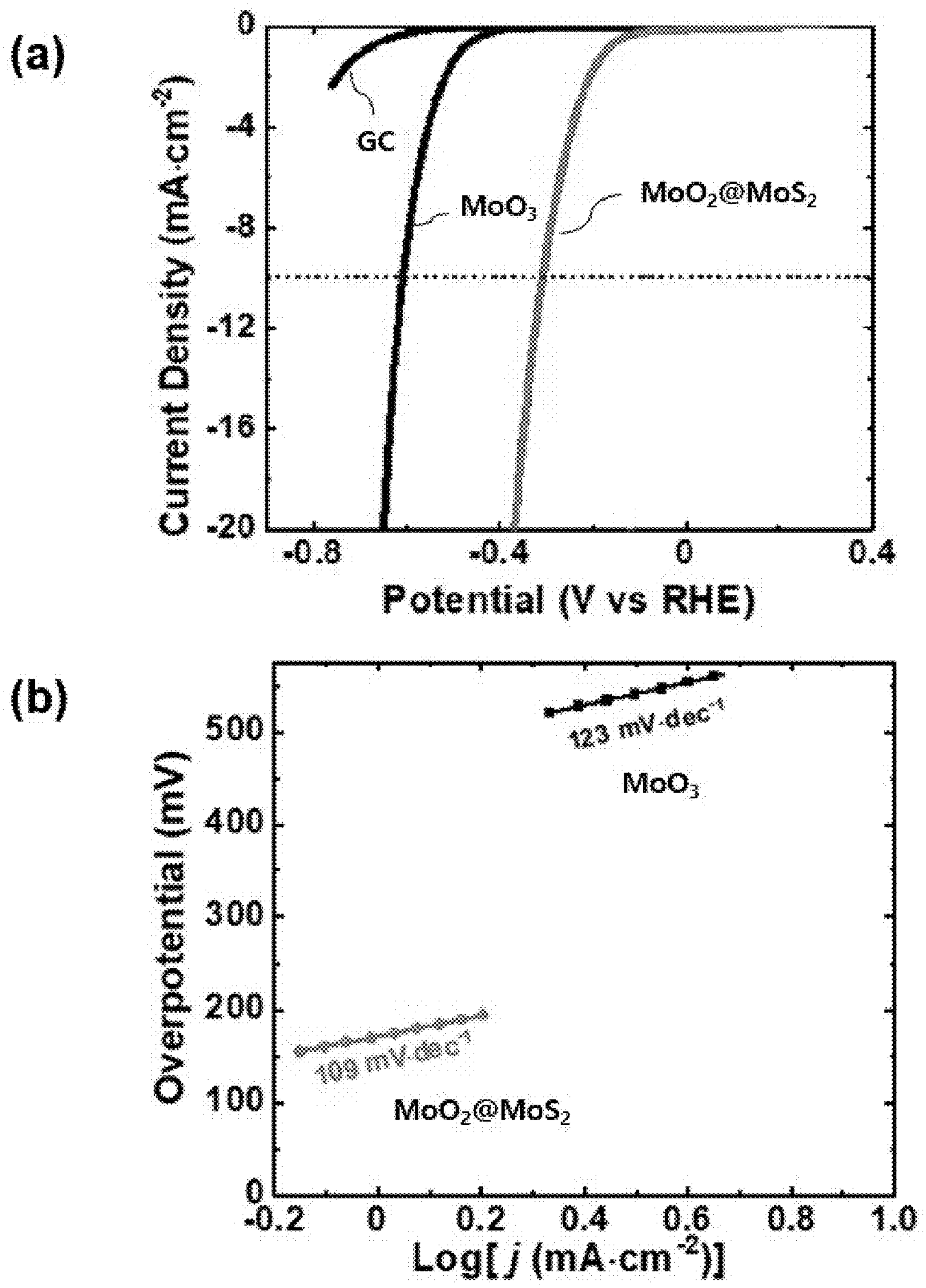
FIGS. 22 to 24 are views showing electrochemical properties of a catalyst structure and a base structure according to Example 2 of the present invention.
Figure 23:
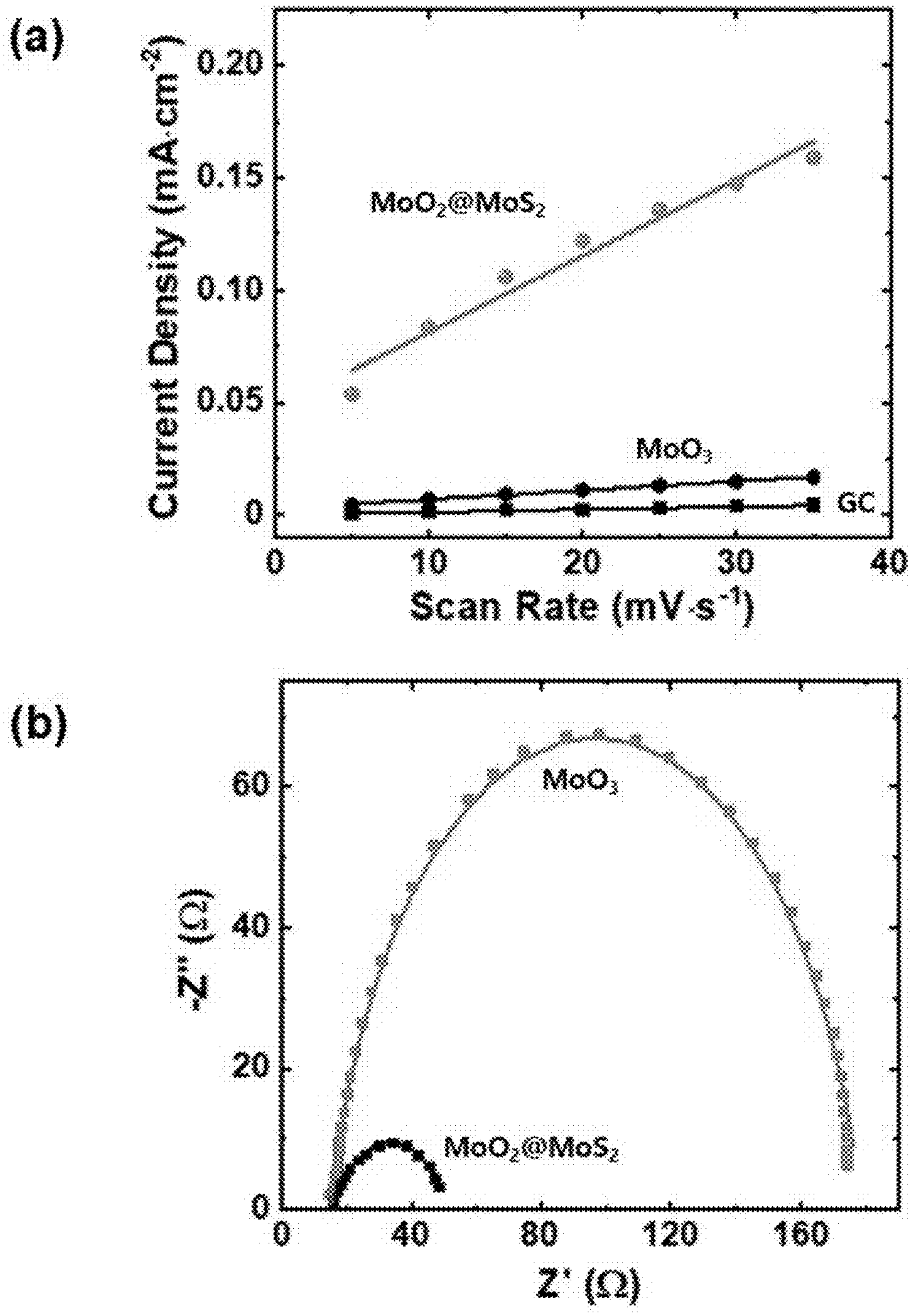
Figure 24:
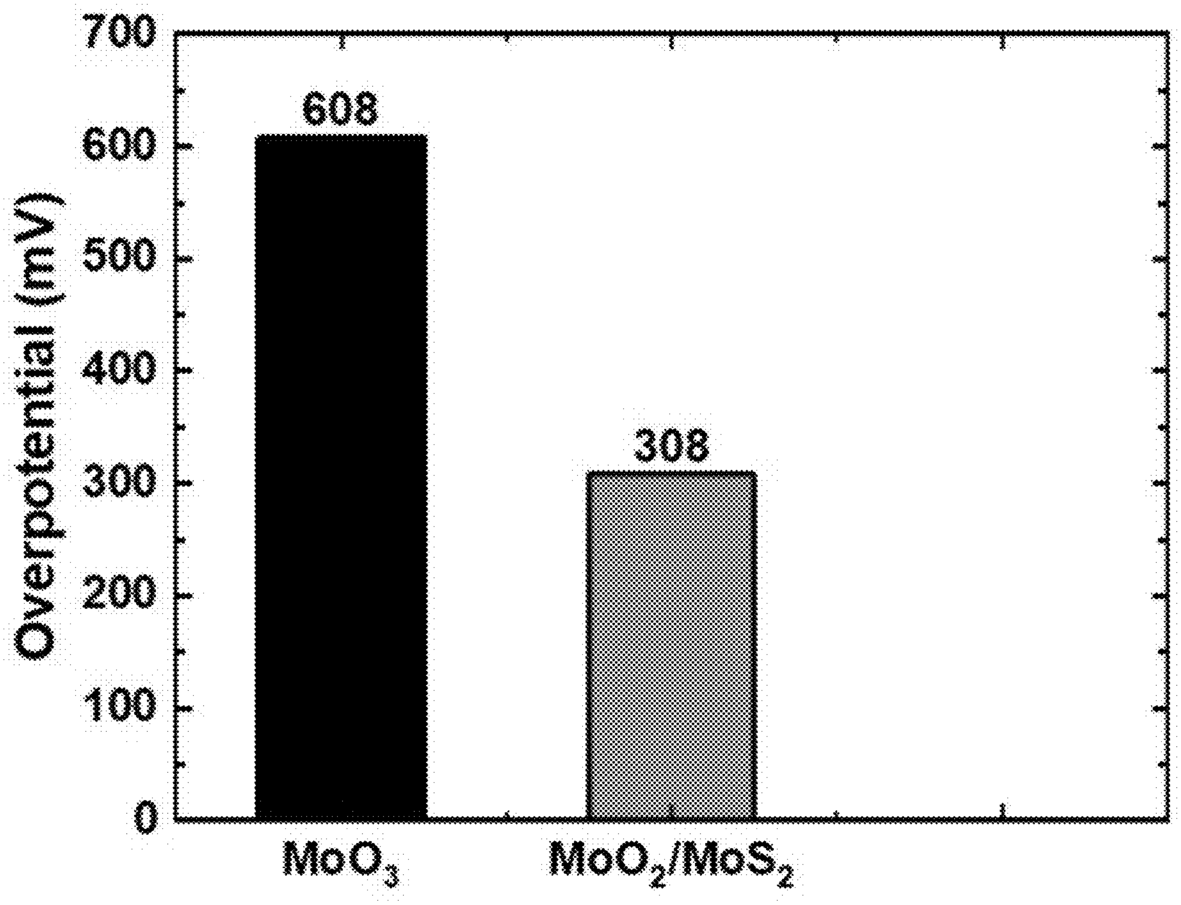

FIGS. 22 to 24 are views showing electrochemical properties of a catalyst structure and a base structure according to Example 2 of the present invention.

(a) of FIG. 22 shows a polarization curve, (b) of FIG. 22 shows a Tafel plot, (a) of FIG. 23 shows a change in current density according to a scan rate, (b) of FIG. 23 shows a Nyquist plot, and FIG. 24 shows an overpotential (mV) when using the base structure and the catalyst structure according to above Example 2 as an active catalyst. In addition, the turnover frequency (TOF) of the above-described active catalysts at an overpotential of 400 mV was calculated. The result values measured in FIGS. 22 to 24 are summarized in <Table 8> below, and the TOF values are summarized in <Table 9> below.

TABLE 8

| Classification | Tafel slope mV/dec | Over-potential(η) mV at 10 mA $cm^{-2}$ | Exchange current density $j_0$ mA $cm^{-2}$@over-potential(η) = 0 | Charge transfer resistance $R_{ct}$ ohm |
|---|---|---|---|---|
| Base structure | 123 | 608 | $1.09 \times 10^{-4}$ | 163.1 |
| Catalyst structure | 112 | 308 | 0.03 | 35.9 |

TABLE 9

| Classification | TOF($S^{-1}$) η = 400 mV |
|---|---|
| Base structure | $2.64 \times 10^{-5}$ |
| Catalyst structure | $5.8 \times 10^{-3}$ |

Figure 25:
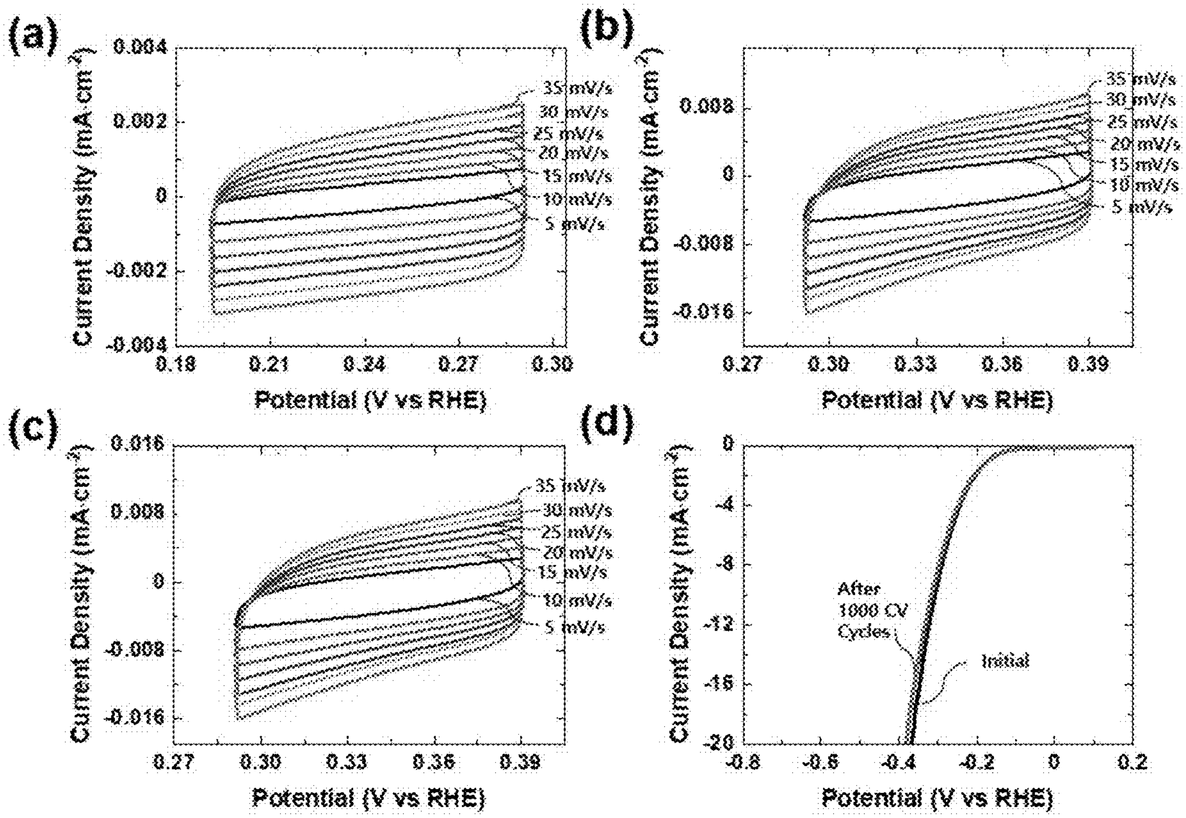
FIG. 25 is a graph showing electrochemically active surface areas and stability of a catalyst structure and a base structure according to Example 2 of the present invention.

FIG. 25 is a graph showing electrochemically active surface areas and stability of a catalyst structure and a base structure according to Example 2 of the present invention. Referring to (a) to (c) of FIG. 25, the electrochemical active surface areas (ECSA) of the active catalyst were calculated by extracting a double-layer capacitance ($C_{dl}$) through cyclic voltammetry (CV) measurement in the cases of not applying an active catalyst, applying the base structure ($MoO_3$) according to above Example 2 as an active catalyst, and applying the catalyst structure ($MoO_2/MoS_2$) according to above Example 2. The calculated results are summarized in <Table 10> below.

TABLE 10

| Classification | Slope (mF $cm^{-2}$) | $C_{dl}$ (mF $cm^{-2}$) | Rf | ECSA $cm^2$ |
|---|---|---|---|---|
| Active catalyst x | 0.121 | 0.0607 | — | — |
| Base structure | 0.402 | 0.2012 | 3.31 | 0.23 |
| Catalyst structure | 3.39 | 1.695 | 27.92 | 1.95 |

Figure 26:
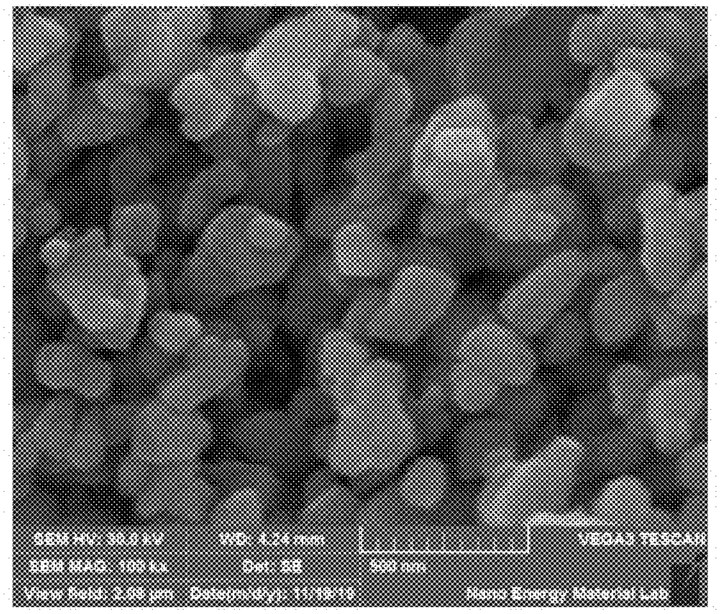
FIG. 26 is a view showing FE-SEM images of a base structure according to Example 3 of the present invention.
Figure 26:
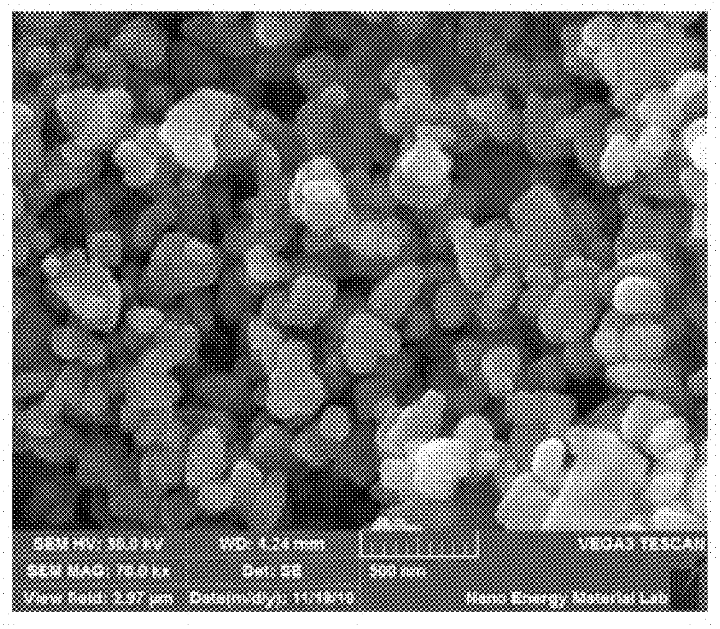
Figure 27:
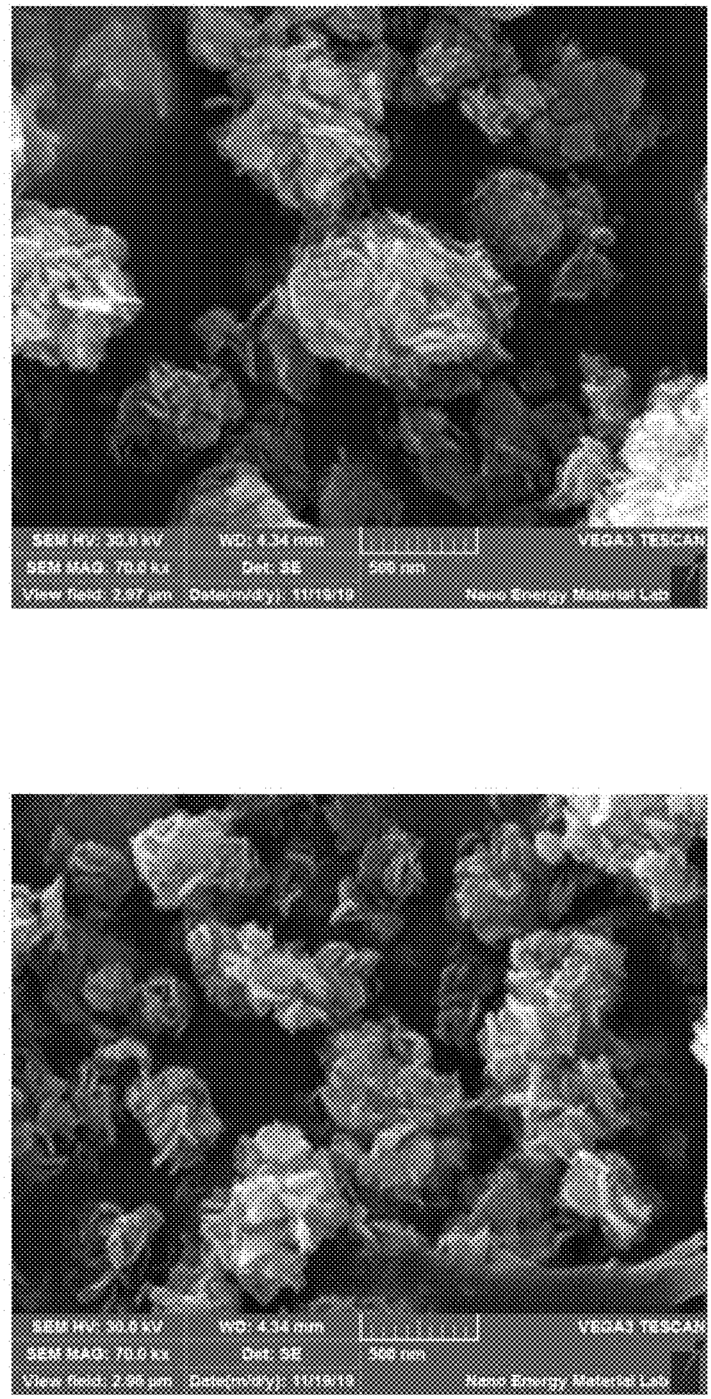
FIG. 27 is a view showing FE-SEM images of a catalyst structure according to Example 3 of the present invention.
Figure 28:
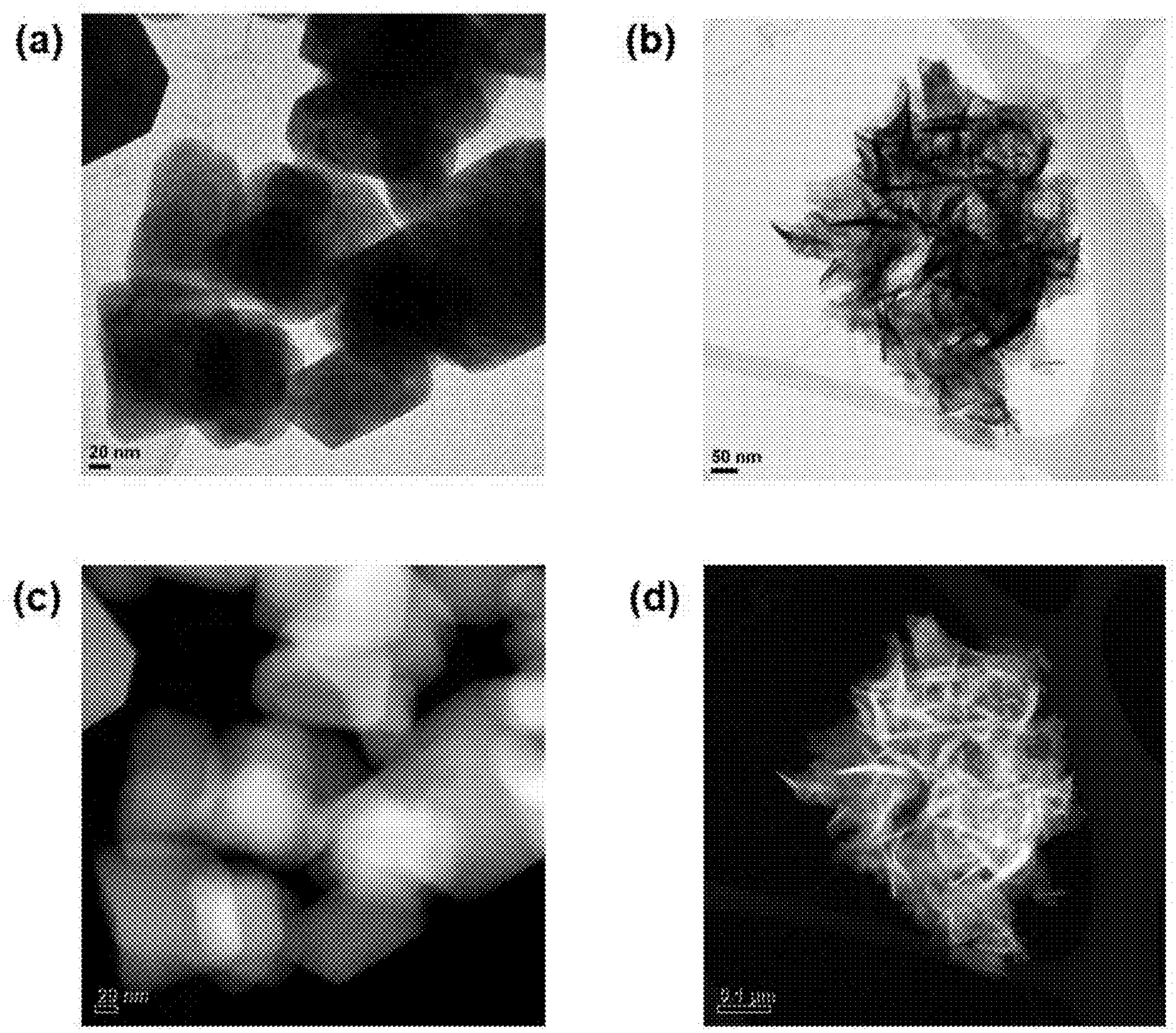
FIG. 28 is a view showing TEM images of a catalyst structure and a base structure according to Example 3 of the present invention.

Referring to (d) of FIG. 25, the catalyst structure according to above Example 2 may be provided. After preparing a three-electrode system in which the provided catalyst structure was applied as an active catalyst, 1000 CV cycles were performed and stability was measured. As can be understood from (d) of FIG. 25, it could be confirmed that a current density remains substantially constant during 1000 CV cycles. FIG. 26 is a view showing FE-SEM images of a base structure according to Example 3 of the present invention, FIG. 27 is a view showing FE-SEM images of a catalyst structure according to Example 3 of the present invention, and FIG. 28 is a view showing TEM images of a catalyst structure and a base structure according to Example 3 of the present invention.

Referring to (a) and (b) of FIG. 26, an FE-SEM image of the base structure ($WO_3$) according to Example 3 is shown. Referring to (a) and (b) of FIG. 27, an FE-SEM image of the catalyst structure ($WO_3/WS_2$) according to above Example 3 is shown. And, referring to (a) to (d) of FIG. 28, a TEM image of the catalyst structure ($WO_3/WS_2$) according to above Example 3 is shown. As can be understood from FIGS. 26 to 28, it could be confirmed that the catalyst structure according to above Example 3 has a $WS_2$ shell structure formed on the surface of the $WO_3$ base structure.

Figure 29:
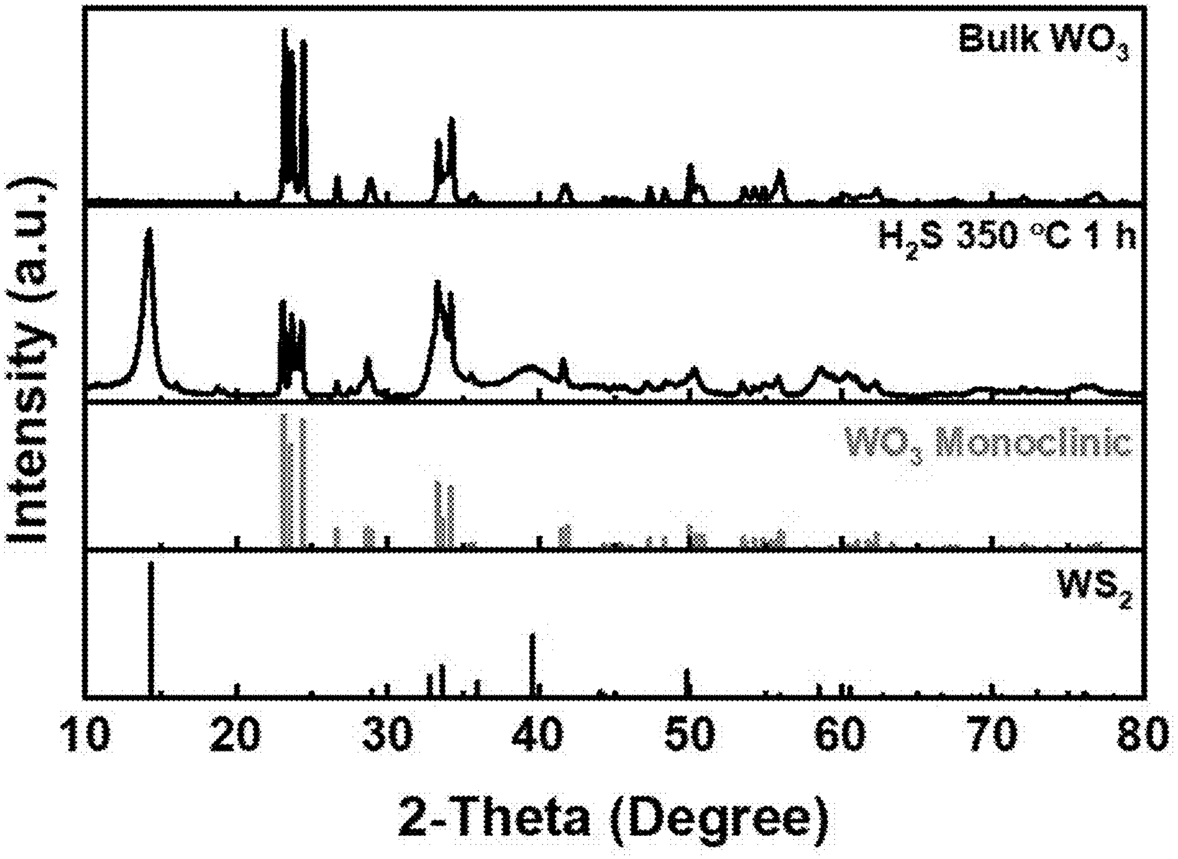
FIG. 29 is a view showing the results of XRD analysis of a catalyst structure and a base structure according to Example 3 of the present invention.
Figure 30:
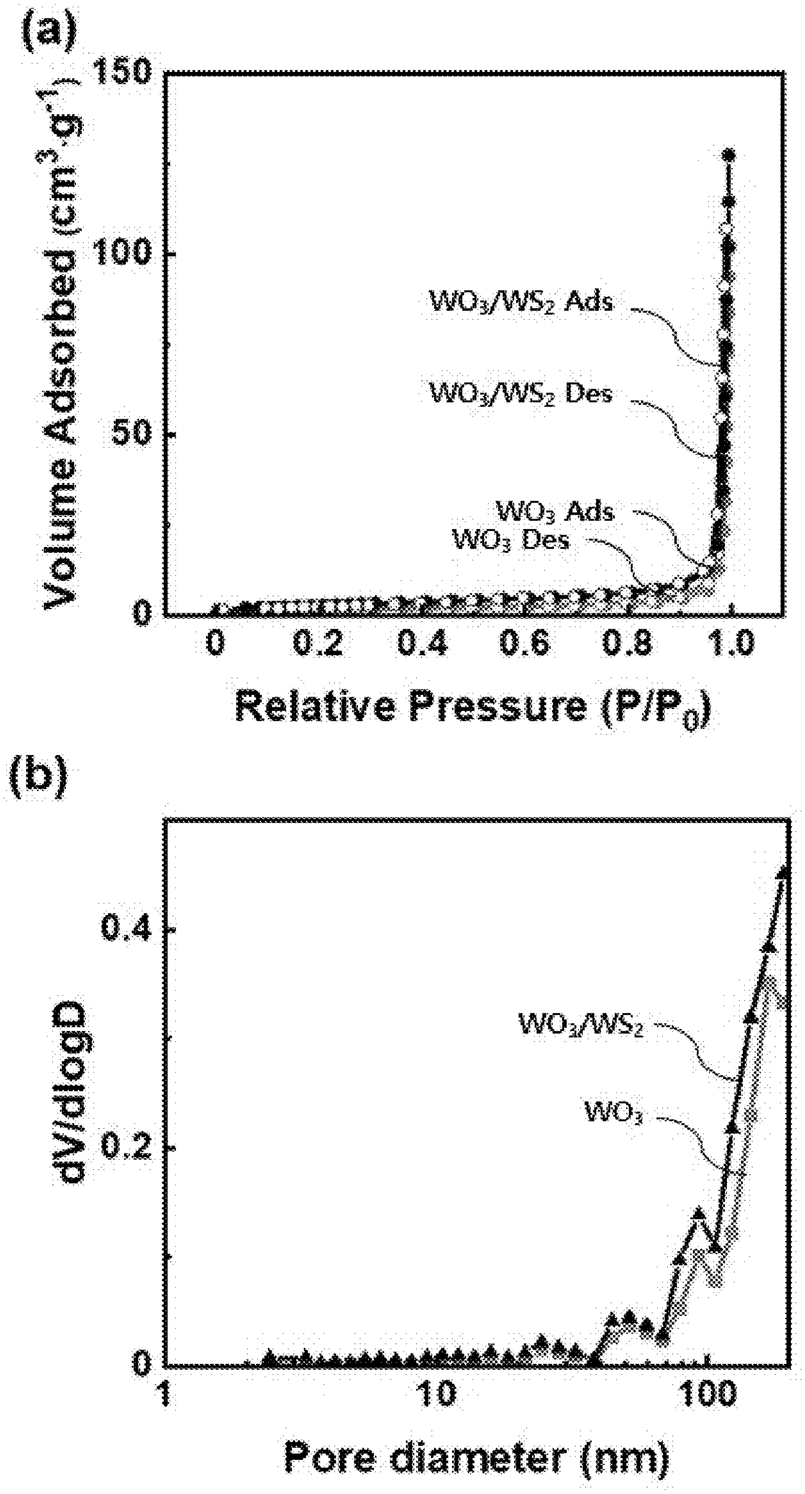
FIG. 30 is a view showing an area of a catalyst structure and a base structure according to Example 3 of the present invention.

FIG. 29 is a view showing results of XRD analysis of a catalyst structure and a base structure according to Example 3 of the present invention, and FIG. 30 is a view showing an area of a catalyst structure and a base structure according to Example 3 of the present invention.

Referring to FIG. 29, an XRD analysis was performed on the base structure ($WO_3$) and the catalyst structure ($WO_3/WS_2$) according to above Example 3, and the results thereof are shown (Bulk $WO_3$: black, $WO_3$ Monoclinic: red, $WS_2$: blue). As can be understood from FIG. 29, it could be confirmed that $WS_2$ is produced as the base structure is heat-treated in a hydrogen sulfide ($H_2S$) atmosphere.

Referring to (a) of FIG. 30, a surface area of the base structure ($WO_3$) and the catalyst structure ($WO_3/WS_2$) according to above Example 3 was measured and shown by using the Brunauer-Emmett-Teller (BET) method, and referring to (b) of FIG. 30, a pore size distribution of the base structure ($WO_3$) and the catalyst structure ($WO_3/WS_2$) according to above Example 2 was measured and shown by using the Barrett-Joyner-Halenda (BJH) method. The measured results are summarized in <Table 11> below.

TABLE 11

| Classification | $a_{s,BET}$ ($m^2/g$) | Total pore volume ($p/p_0 = 0.990$) ($cm^3/g$) | Mean pore diameter (nm) |
|---|---|---|---|
| Base structure | 6.5009 | 0.089212 | 54.892 |
| Catalyst structure | 9.3899 | 0.1245 | 53.038 |

Figure 31:
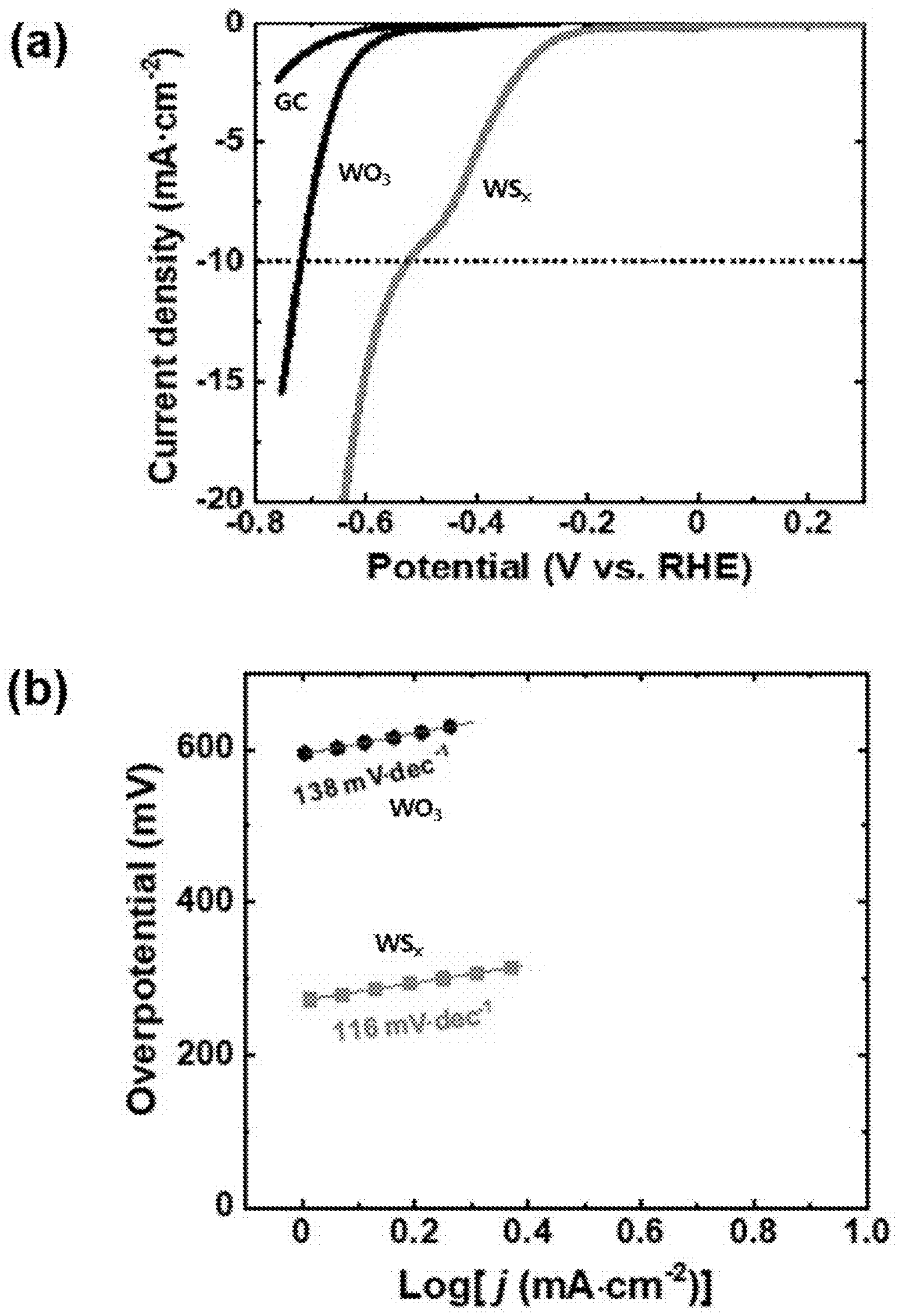
FIGS. 31 to 33 are views showing electrochemical properties of a catalyst structure and a base structure according to Example 3 of the present invention.
Figure 32:
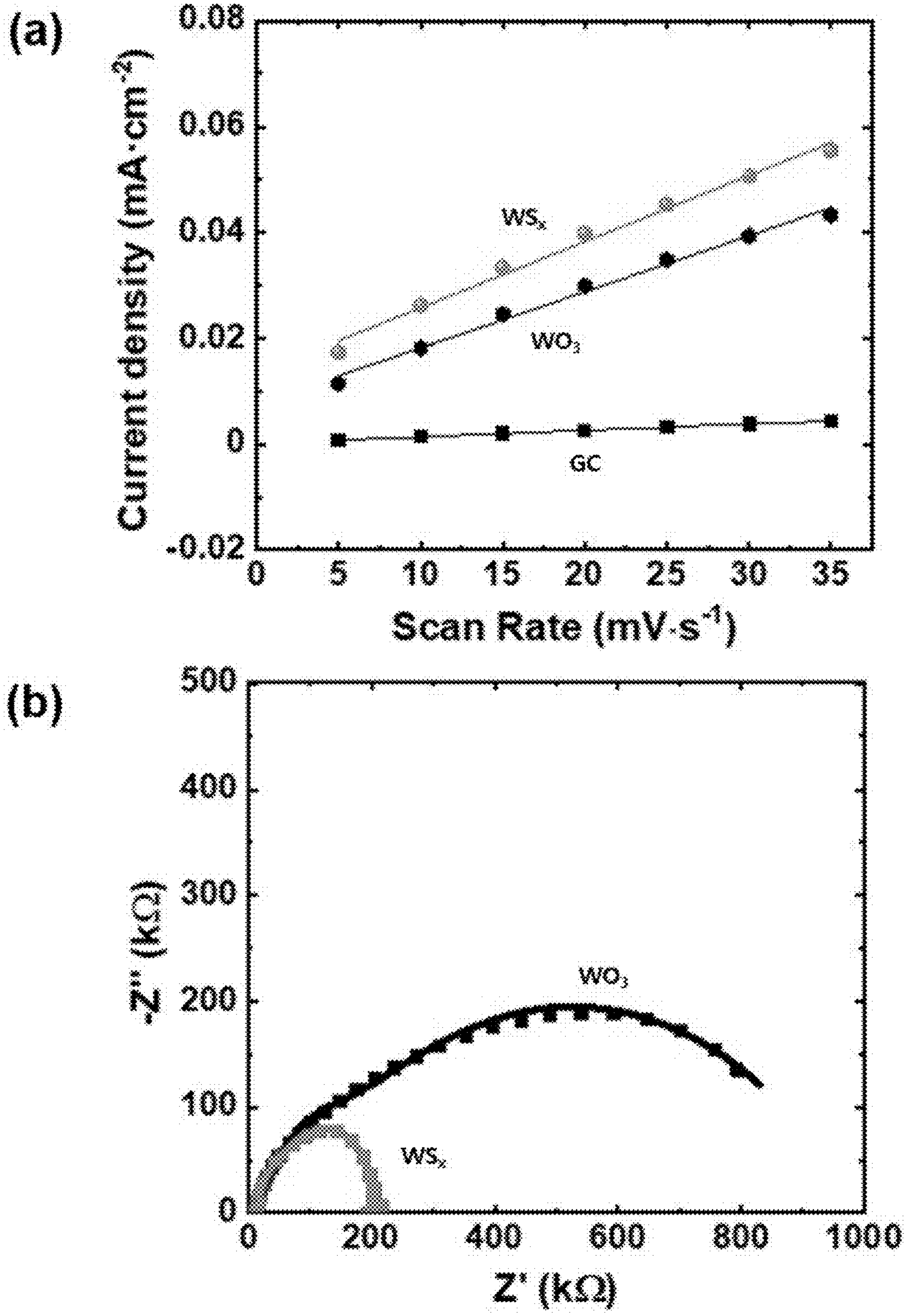
Figure 33:
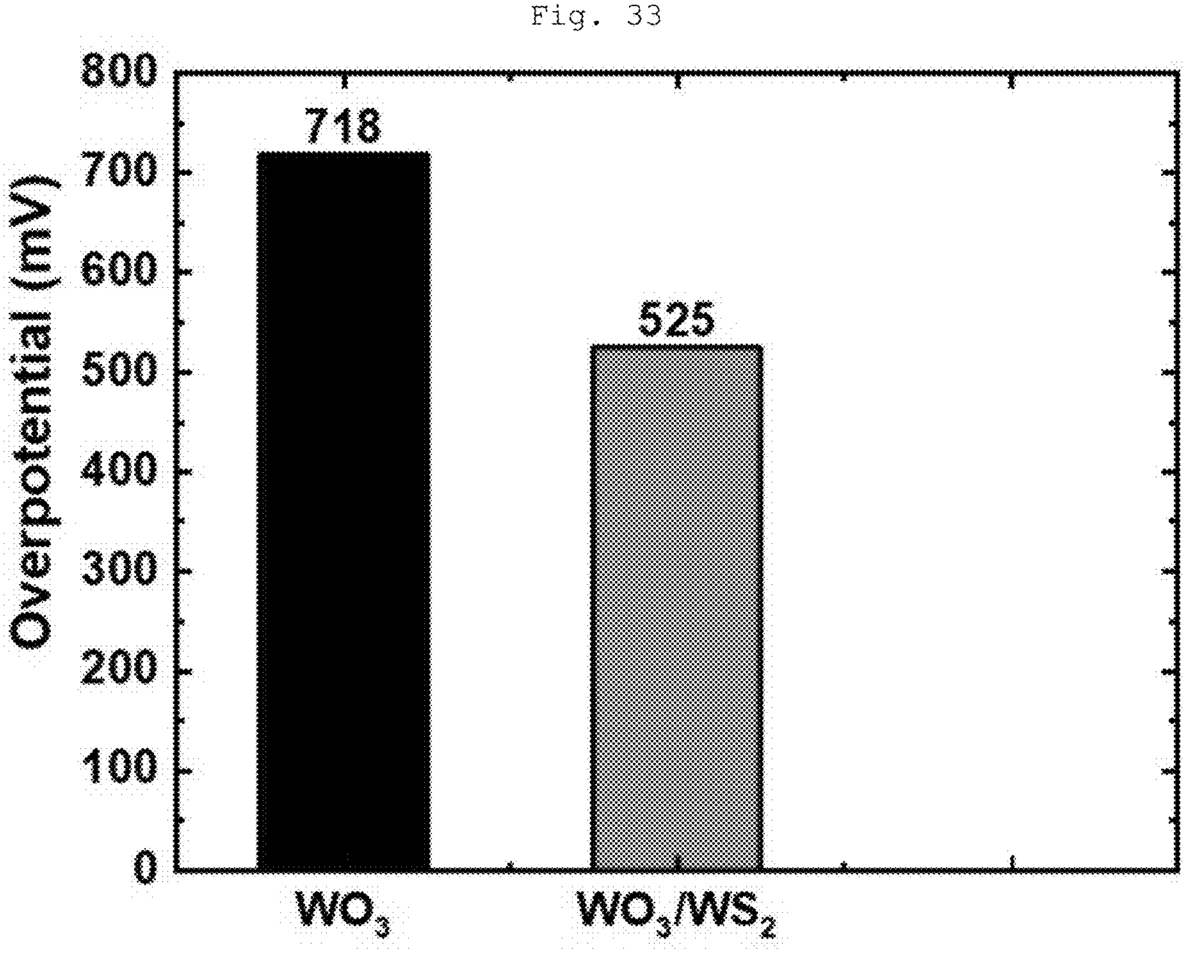

As can be understood from <Table 11>, it could be confirmed that a surface area ($a_{s,BET}$) is widened and a mean pore diameter is decreased as the base structure is heat-treated under hydrogen sulfide ($H_2S$). FIGS. 31 to 33 are views showing electrochemical properties of a catalyst structure and a base structure according to Example 3 of the present invention.

(a) of FIG. 31 shows a polarization curve, (b) of FIG. 31 shows a Tafel plot, (a) of FIG. 32 shows a change in current density according to a scan rate, (b) of FIG. 32 shows a Nyquist plot, and FIG. 33 shows an overpotential (mV) when using the base structure and the catalyst structure according to Example 3 as an active catalyst. In addition, the turnover frequency (TOF) of the above-described active catalysts at an overpotential of 400 mV was calculated. The result values measured in FIGS. 31 to 33 are summarized in <Table 12> below, and the TOF values are summarized in <Table 13> below.

TABLE 12

| Classification | Tafel slope mV/dec | Over-potential(η) mV at 10 mA $cm^{-2}$ | Exchange current density $j_0$ mA $cm^{-2}$@over-potential(η) = 0 | Charge transfer resistance $R_{ct}$ ohm |
|---|---|---|---|---|
| Base structure | 138 | 718 | $0.5 \times 10^{-4}$ | 925 |
| Catalyst structure | 116 | 525 | 0.0046 | 134 |

TABLE 13

| Classification | TOF($S^{-1}$) η = 400 mV |
|---|---|
| Base structure | $1.1 \times 10^{-4}$ |
| Catalyst structure | $4.7 \times 10^{-3}$ |

Figure 34:
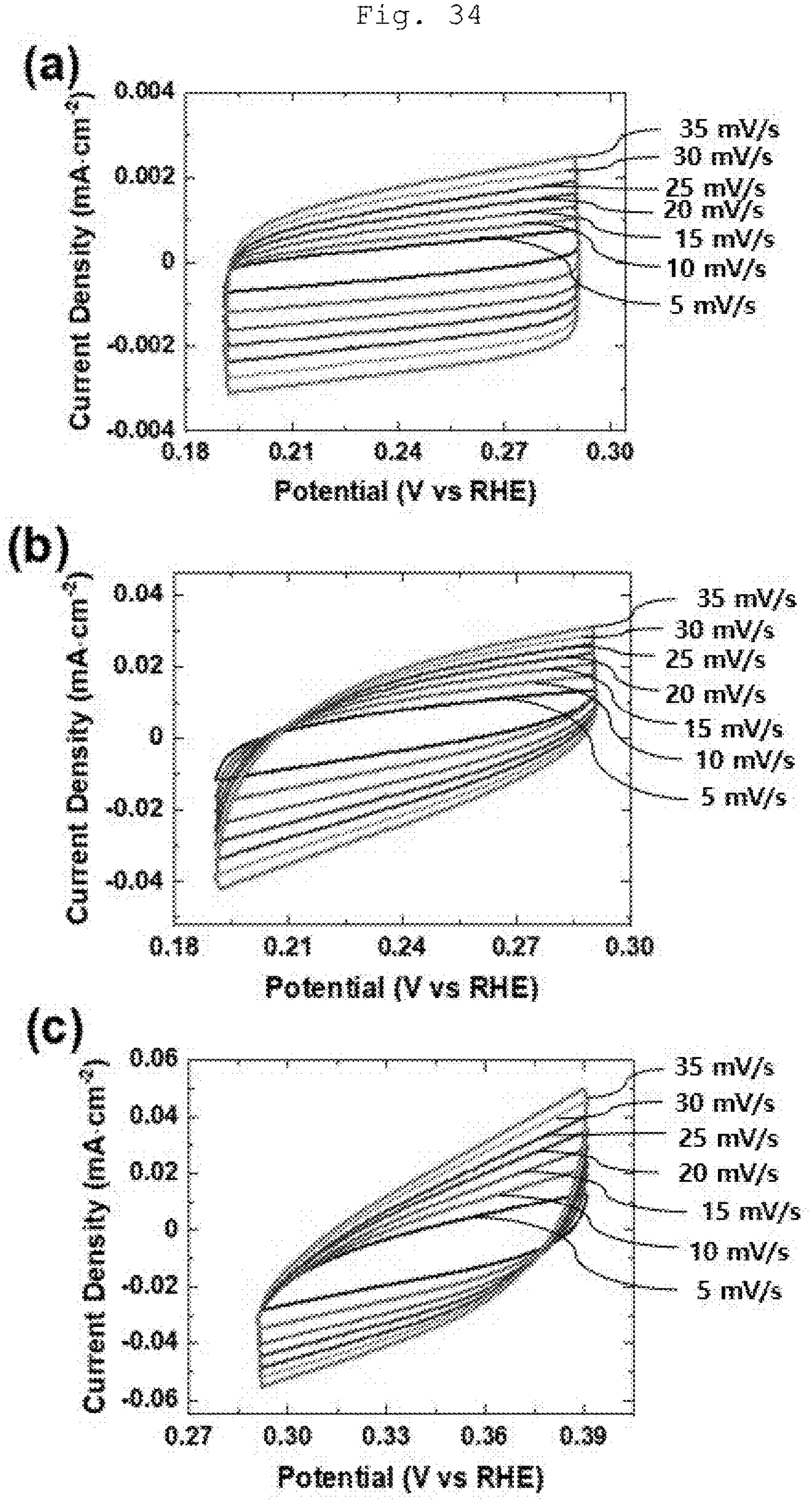
FIG. 34 is a graph showing electrochemically active surface areas and stability of a catalyst structure and a base structure according to Example 2 of the present invention.

FIG. 34 is a graph showing electrochemically active surface areas and stability of a catalyst structure and a base structure according to Example 2 of the present invention. Referring to (a) to (c) of FIG. 34, the electrochemical active surface areas (ECSA) of the active catalyst were calculated by extracting a double-layer capacitance ($C_{dl}$) through cyclic voltammetry (CV) measurement in the cases of not applying an active catalyst, applying the base structure ($WO_3$) according to above Example 3 as an active catalyst, and applying the catalyst structure ($WO_3/WS_2$) according to above Example 3. The calculated results are summarized in <Table 14> below.

TABLE 14

| Classification | Slope (mF $cm^{-2}$) | $C_{dl}$ (mF $cm^{-2}$) | Rf | ECSA $cm^2$ |
|---|---|---|---|---|
| Active catalyst x | 0.121 | 0.0607 | — | — |
| Base structure | 1.06 | 0.53 | 8.73 | 0.611 |
| Catalyst structure | 1.25 | 0.625 | 10.29 | 0.72 |

Figure 35:
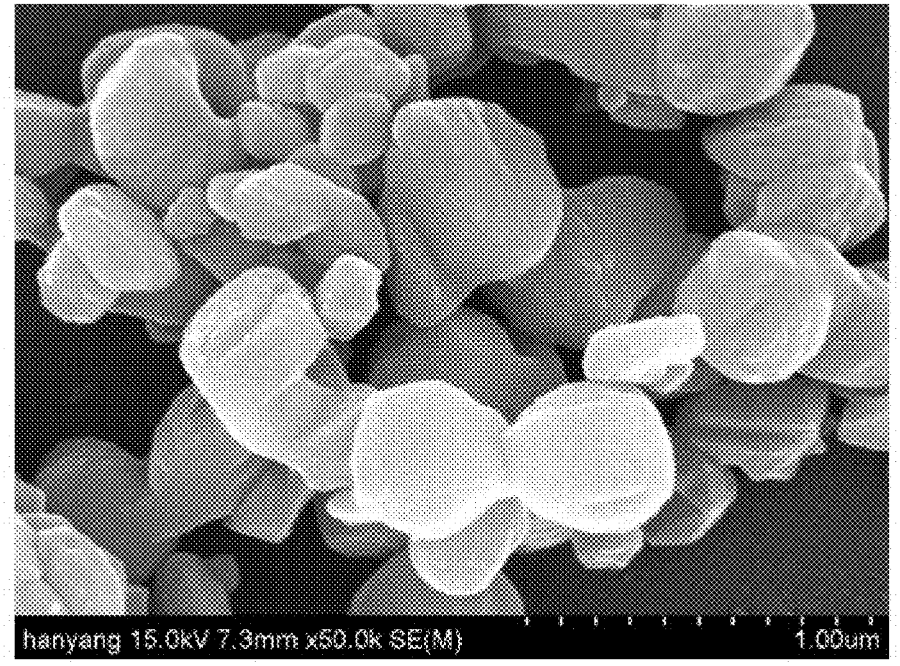
FIG. 35 is a view showing FE-SEM images of a base structure according to Example 4 of the present invention.
Figure 35:
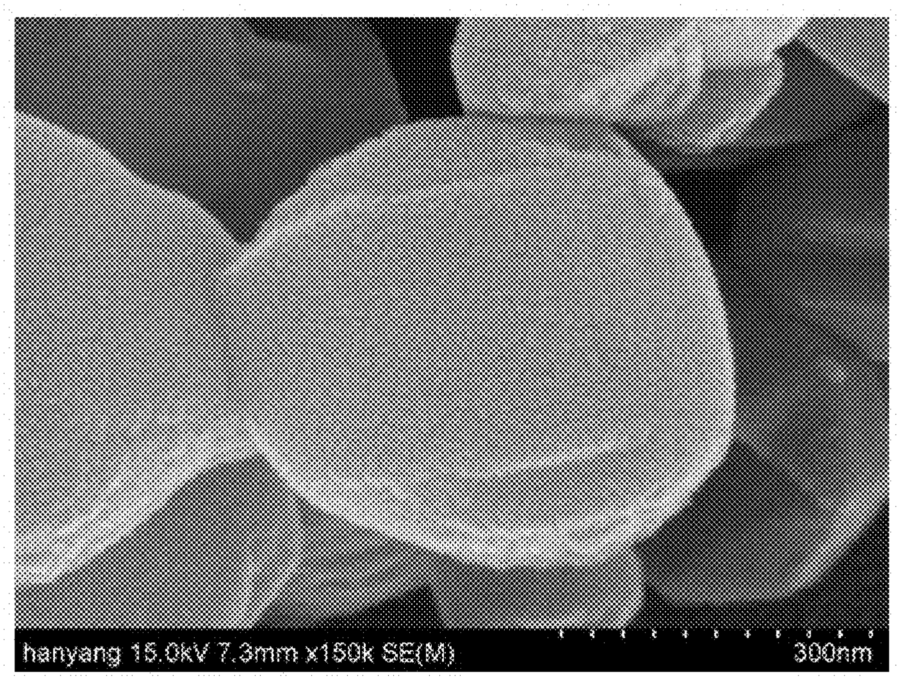
Figure 36:
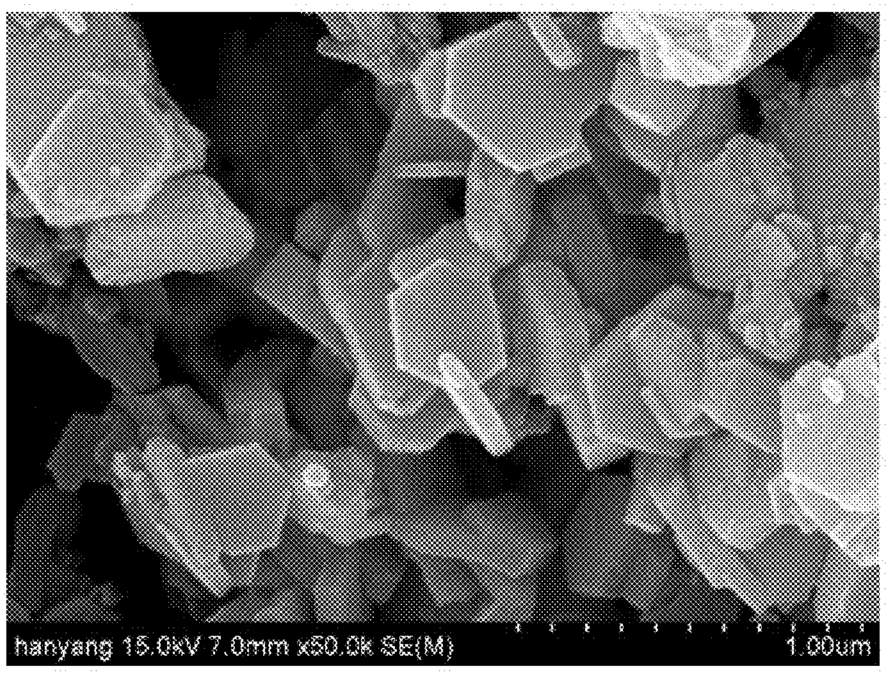
FIG. 36 is a view showing FE-SEM images of a catalyst structure according to Example 4 of the present invention.
Figure 36:
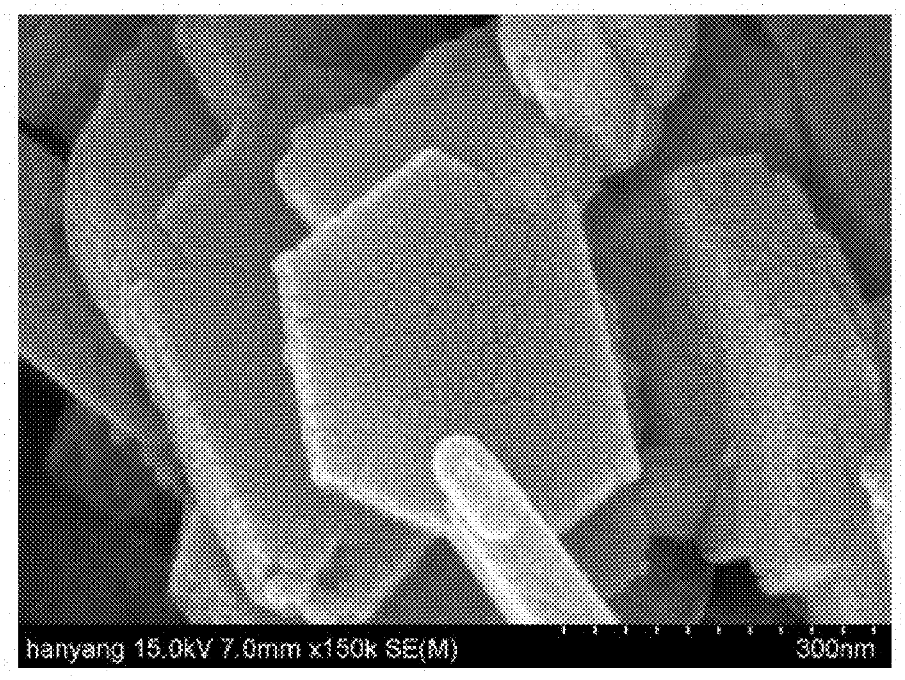

FIG. 35 is a view showing FE-SEM images of a base structure according to Example 4 of the present invention, and FIG. 36 is a view showing FE-SEM images of a catalyst structure according to Example 4 of the present invention. Referring to (a) and (b) of FIG. 35, an FE-SEM image of the base structure ($V_2O_5$) according to above Example 4 is shown, and referring to (a) and (b) of FIG. 36, an FE-SEM image of the catalyst structure ($VS_2$) according to above Example 4 is shown. As can be understood from FIGS. 35 and 36, it could be confirmed that the catalyst structure ($VS_2$) is formed as the base structure ($V_2O_5$) is heat-treated in a hydrogen sulfide ($H_2S$) atmosphere.

Figure 37:
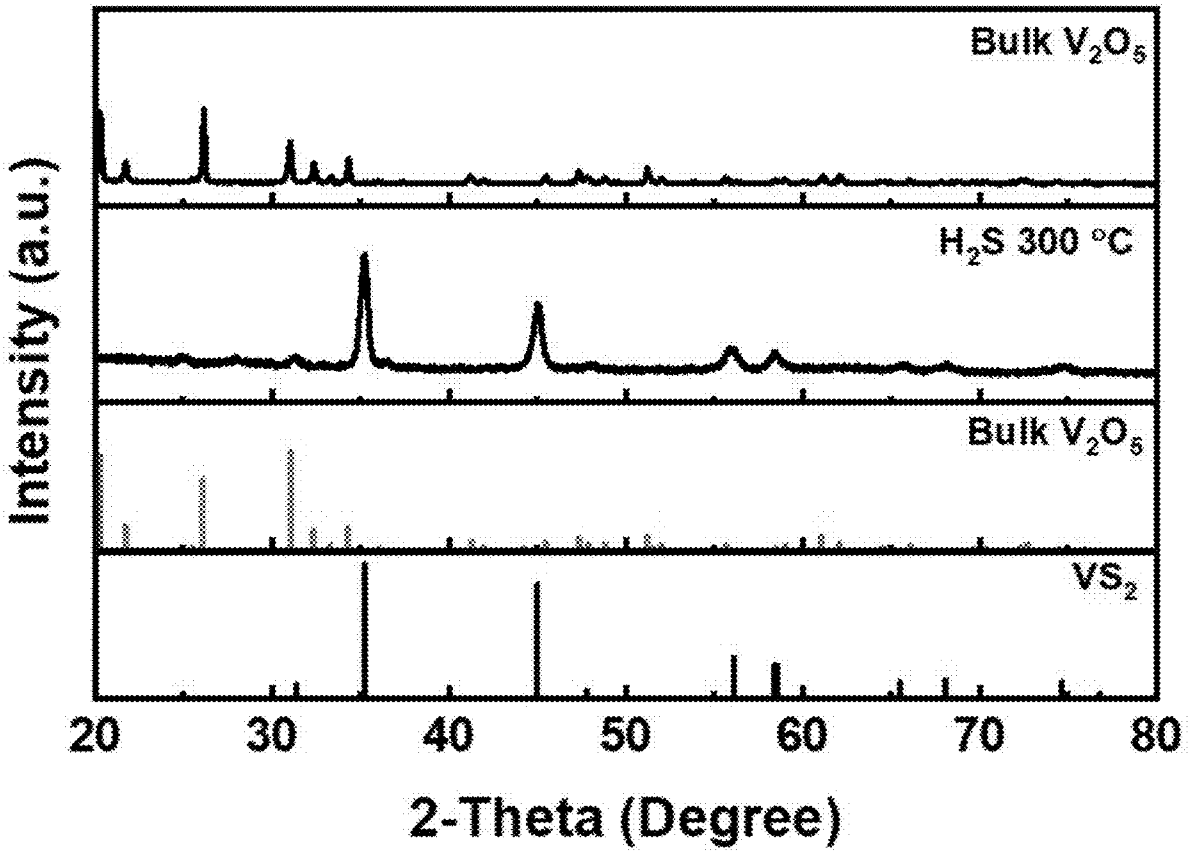
FIG. 37 is a view showing results of XRD analysis of a catalyst structure and a base structure according to Example 4 of the present invention.
Figure 38:
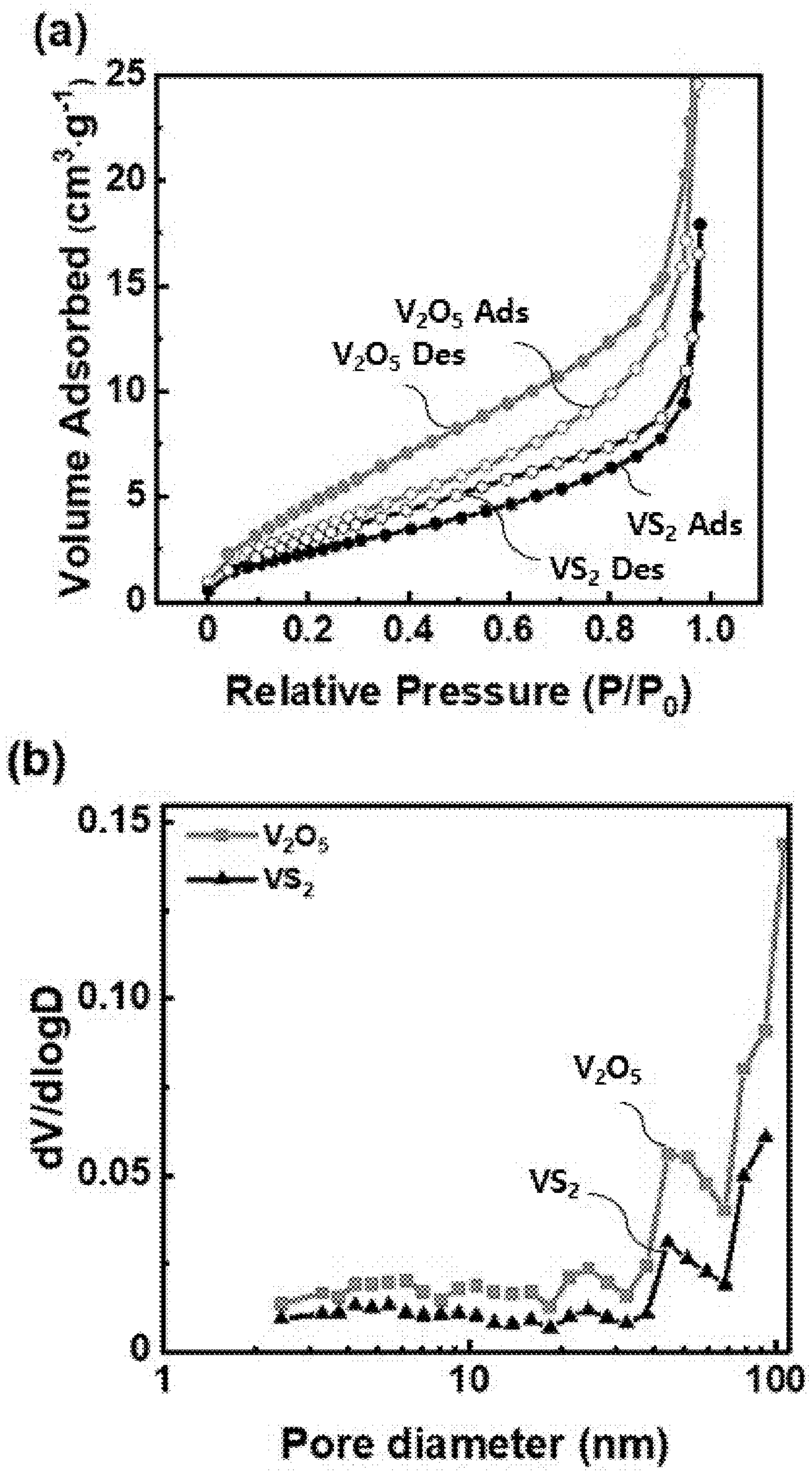
FIG. 38 is a view showing an area of a catalyst structure and a base structure according to Example 4 of the present invention.

FIG. 37 is a view showing results of XRD analysis of a catalyst structure and a base structure according to Example 4 of the present invention, and FIG. 38 is a view showing an area of a catalyst structure and a base structure according to Example 4 of the present invention.

Referring to FIG. 37, XRD analysis was performed on the base structure ($V_2O_5$) and the catalyst structure ($VS_2$) according to above Example 4, and the results thereof are shown (Bulk $V_2O_5$: black, $VS_2$: blue). As can be understood from FIG. 37, it could be confirmed that the catalyst structure ($VS_2$) is formed as the base structure ($V_2O_5$) is heat-treated in a hydrogen sulfide ($H_2S$) atmosphere.

Referring to (a) of FIG. 38, a surface area of the base structure ($V_2O_5$) and the catalyst structure ($VS_2$) according to above Example 4 was measured and shown by using the Brunauer-Emmett-Teller (BET) method, and referring to (b) of FIG. 38, a pore size distribution of the base structure ($V_{205}$) and the catalyst structure ($VS_2$) according to above Example 4 was measured and shown by using the Barrett-Joyner-Halenda (BJH) method. The measured results are summarized in <Table 15> below.

TABLE 15

| Classification | $a_{s,BET}$ ($m^2/g$) | Total pore volume ($p/p_0$ = 0.990) ($cm^3/g$) | Mean pore diameter (nm) |
|---|---|---|---|
| Base structure | 14.872 | 0.0556 | 14.9 |
| Catalyst structure | 9.7641 | 0.0277 | 11.3 |

Figure 39:
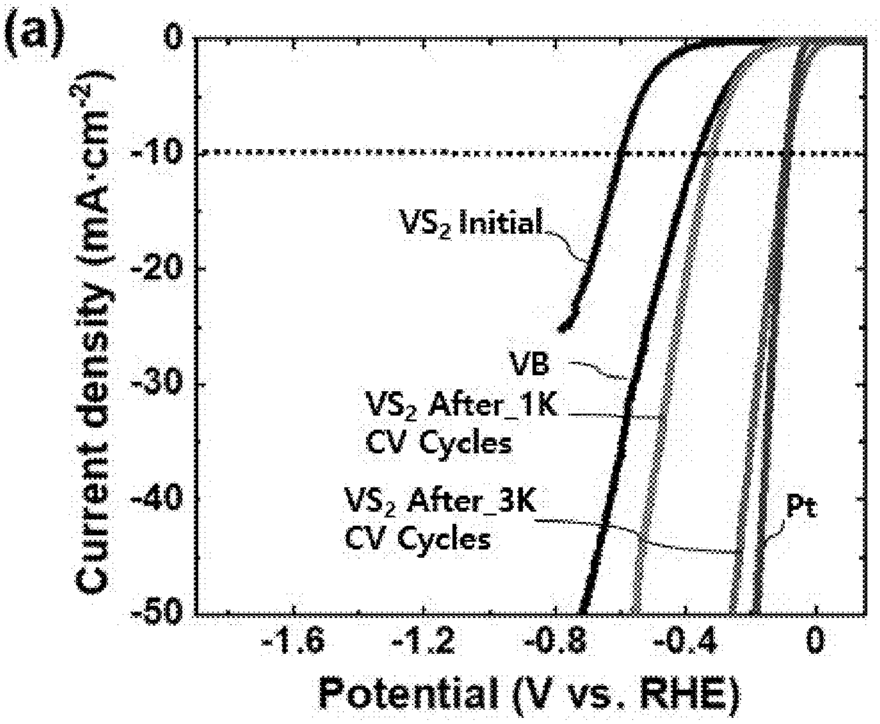
FIG. 39 is a view showing electrochemical properties of a catalyst structure and a base structure according to Example 4 of the present invention.
Figure 39:
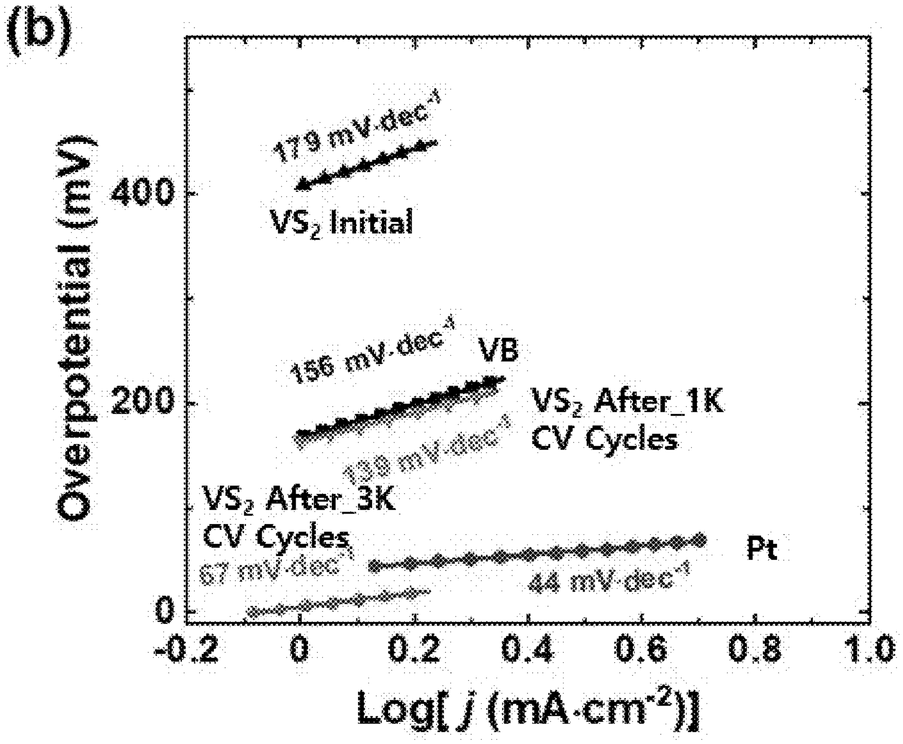

As can be understood from <Table 15>, it could be confirmed that a surface area ($a_{s,BET}$) and a mean pore diameter are decreased as the base structure is heat-treated under hydrogen sulfide ($H_2S$). FIG. 39 is a view showing electrochemical properties of a catalyst structure and a base structure according to Example 4 of the present invention.

(a) of FIG. 39 represents a polarization curve and (b) of FIG. 39 represents a Tafel plot. As can be understood from (a) and (b) of FIG. 39, it could be confirmed that the catalyst structure according to above Example 4 exhibits electrochemical properties not inferior to conventional Pt catalysts used for hydrogen generation.

Although the invention has been described in detail with reference to exemplary embodiments, the scope of the present invention is not limited to a specific embodiment and should be interpreted by the attached claims. In addition, those skilled in the art should understand that many modifications and variations are possible without departing from the scope of the present invention.

INDUSTRIAL APPLICABILITY

According to an embodiment of the present invention, a catalyst structure and a method for preparing the same can be used as a catalyst for an oxygen evolution reaction (OER) or a hydrogen evolution reaction (HER).

SEQUENCE LIST PRETEXT

100: Catalyst structure
110: Base structure

120: Preliminary shell structure

130: Core structure

140: Shell structure

The invention claimed is:

1. An electrochemical catalyst comprising:

a core structure including a first cobalt oxide that comprises $Co_3O_4$, and a second cobalt oxide that comprises CoO; and a shell that is formed on a surface of the core structure, thereby resulting in a core-shell structure having a spherical shape, wherein the shell includes a first cobalt sulfide that comprises $Co_3S_4$, and a second cobalt sulfide that comprises CoS, wherein a total weight of the electrochemical catalyst comprises 49 wt % or more of the first cobalt oxide, 40 wt % or less of the second cobalt oxide, 11 wt % or less of the first cobalt sulfide, and 0.5 wt % or less of the second cobalt sulfide to improve oxygen generation efficiency in an oxygen evolution reaction (OER).

2. The electrochemical catalyst of claim 1, wherein the core structure has a porous structure.

3. The electrochemical catalyst of claim 2, wherein a diameter of pores formed in the core structure is 12 nm or less.

* * * * *